(12) United States Patent
Nishikawa

(10) Patent No.: US 7,778,541 B2
(45) Date of Patent: Aug. 17, 2010

(54) IMAGING APPARATUS

(75) Inventor: Munetaka Nishikawa, Osaka (JP)

(73) Assignee: Sony Corporation, Tokyo (JP)

( * ) Notice: Subject to any disclaimer, the term of this patent is extended or adjusted under 35 U.S.C. 154(b) by 137 days.

(21) Appl. No.: 12/232,991

(22) Filed: Sep. 26, 2008

(65) Prior Publication Data
US 2009/0142047 A1 Jun. 4, 2009

(30) Foreign Application Priority Data
Nov. 30, 2007 (JP) ............................ 2007-310509

(51) Int. Cl.
*G03B 15/03* (2006.01)
(52) U.S. Cl. ...................................... 396/177; 396/178
(58) Field of Classification Search ................ 396/176, 396/177, 178; 348/370, 371
See application file for complete search history.

(56) References Cited

U.S. PATENT DOCUMENTS 4,893,140 A * 1/1990 Yamamoto et al. .......... 396/177
4,910,542 A * 3/1990 Yamamoto et al. .......... 396/165
5,066,967 A * 11/1991 Yamamoto et al. .......... 396/177
6,351,609 B1 * 2/2002 Hosokawa et al. .......... 396/177
6,374,051 B1 * 4/2002 Yamane ...................... 396/177

FOREIGN PATENT DOCUMENTS

JP        62-121428         6/1987

* cited by examiner

*Primary Examiner*—Rodney E Fuller
(74) *Attorney, Agent, or Firm*—Rader, Fishman & Grauer PLLC

(57) ABSTRACT

An imaging apparatus includes a flash light emitting portion moving between a housed position and a light emitting position, a biasing means for biasing the flash light emitting portion toward the light emitting position, a member to be locked moving with a movement of the flash light emitting portion, a locking means for locking the member to be locked in a state in which the flash light emitting portion exists at the housed position and suppressing change of the position of the flash light emitting portion, opposing a biasing force by the biasing means and a lock releasing means having an electromagnet and a moving portion, for releasing a locked state of the member to be locked by moving the moving portion in a direction apart from the electromagnet by applying electric current to the electromagnet and by allowing the locking means to pivot about an axis.

8 Claims, 18 Drawing Sheets

FIG. 10 NORMAL LOCK STATE

NORMAL OPEN STATE

NORMAL CLOSE OPERATION

ABNORMAL LOCK STATE

LOCK 1 IN ABNORMAL LOCK STATE

LOCK 2 IN ABNORMAL LOCK STATE

LOCK 3 IN ABNORMAL LOCK STATE

IMAGING APPARATUS

CROSS REFERENCE TO RELATED APPLICATIONS

The present invention contains subject matter related to Japanese Patent Application JP 2007-310509 filed in the Japanese Patent Office on Nov. 30, 2007, the entire contents of which being incorporated herein by reference.

BACKGROUND OF THE INVENTION

1. Field of the Invention

The invention relates to an imaging apparatus such as a digital camera.

2. Description of the Related Art

In single lens reflex-type imaging apparatuses and the like, there exists an apparatus including a pop-up built-in flash (refer to JP-A-62-121428 (Patent Document 1)).

A light emitting portion (flash light emitting portion) of the above pup-up built-in flash rises from a housed position (lower position) to a light emitting position (upper position) automatically and becomes in a state in which light can be emitted when it is determined that flash light emission is necessary based on a measured result and the like. After that, when a user determines that the flash light emission is not necessary, the flash light emission portion is pressed down to the housing position by the user to be housed in a state integrated with the camera body.

In the built-in flash, biasing force to consistently move the flash light emitting portion to the side of the light emitting position is applied. In a state in which the flash light emitting portion is pressed down to the housed position, the flash emitting portion is held so as not to be popped up by a given lock mechanism. That is, the flash light emitting portion is in a locked state. When it is determined that flash light emission is necessary, the locked state by the lock mechanism is released due to a given moving portion being driven by a drive portion.

SUMMARY OF THE INVENTION

When the locked state of the built-in flash is automatically released, a drive means using an electromagnet is often used. Specifically, a position of the moving portion of the drive means is changed by adjusting electromagnetic force by the electromagnet, and the given lock mechanism connected to the moving portion is moved to thereby release the locked state.

Attracting force by the electromagnet is larger as the distance between the electromagnet and a target object is smaller. Therefore, when the distance between the electromagnet and the moving portion is relatively small, the electromagnet allows relatively large force to act on the moving portion.

However, in a structure as in Patent Document 1, an operation of drawing the moving portion existing at a position relatively apart by the electromagnet is performed at the time of releasing the lock. Accordingly, in order to allow sufficient large force to act, it is necessary to supply relatively large electric current. On the other hand, it is preferable that electric current is relatively small in the light of reducing power consumption.

The present inventors have devised the following reference example. In the reference example, contrary to Patent Document 1, an operation of allowing the moving portion existing relatively close to be apart (drag away) by the electromagnet is performed. That is, the operation of moving the moving portion in the direction apart from the electromagnetic and the like (fixed portion) is performed.

Specifically, an imaging apparatus 100 according to the reference example includes a flash mechanism having a lock mechanism 132 and the like as shown in a longitudinal sectional view of FIG. 19. In the flash mechanism, a flash light emitting portion (not shown) can move upward and downward between a housed position and a light emitting position, in which a lock pin 126 connected at the side of the flash light emitting portion moves upward and downward according to the upward-and-downward movement. The flash light emitting portion is biased toward the light emitting position by a pop-up spring, and when the lock of the lock pin 126 is released as described later, the flash light emitting portion moves to the light emitting position by biasing force due to the pop-up spring. On the other hand, when the flash light emitting portion is housed, the lock pin 126 is locked by the lock mechanism 132 (specifically, a concave portion 132u) to suppress change of the position of the flash light emitting portion (moving upward) as shown in FIG. 19.

At the upper side of the lock mechanism 132, the concave portion 132u having an approximately U-shape is provided. The concave portion 132u includes a hook portion 132f locking the lock pin 126 and a receiving portion 132r touching the lock pin 126 which moves downward. The lock mechanism 132 pivots about a given axis AX1, and a moving portion 143 of the drive means is connected to a part of the lock mechanism 132. In a state in which the moving portion 143 exists at a near-side position (described later) P1, the lock pin 126 is locked by the hook portion 132f.

Electric current is applied to the electromagnet in a state of the locked state as shown in FIG. 19, that is, the state in which the moving portion 143 exists at the near-side position P1, thereby realizing pop-up operation of the flash light emitting portion.

Specifically, as shown in FIG. 20, the moving portion (moving core) 143 moves from the position relatively close to the electromagnet (also referred to as "near-side position") P1 (FIG. 19) to a position relatively far from the electromagnet ("far-side position") P2 (FIG. 20) due to the current application to the electromagnet (solenoid coil). With this movement, the lock mechanism 132 pivots clockwise about the given axis AX1, the lock pin 126 locked by the hook portion 132f at a tip of the lock mechanism is disengaged to release the locked state (engaged state) by the lock mechanism 132. As a result, the flash light emitting portion biased to the upper side by the pop-up spring moves upward to a given position (light emitting position). At this time, the moving portion 143 exists at the "far-side position" P2 continuously. The power application to the electromagnet is performed only during a power-application period of short time (for example, 0.5 seconds) for releasing the lock, and current is not applied to the electromagnet in other periods.

After the imaging operation with the flash light emitting operation is performed in the state in which the flash light emitting portion exists in the light emitting position, the flash light emitting portion is housed at appropriate timing.

Specifically, when the flash light emitting portion is housed, the operation of pressing down the flash light emitting portion is performed by the user to allow the flash light emitting portion to move downward. As shown in FIG. 21, when the lock pin 126 provided at the side of the flash light emitting portion moves downward with the downward movement of the flash light emitting portion and the lock pin 126 further moves downward while touching the receiving portion 132r of the lock mechanism 132, the lock mechanism 132 pivots counterclockwise about the axis AX1. With the pivoting of the lock mechanism 132, the lock pin 126 is inserted toward the inside (bottom side) of the concave portion while touching the receiving portion 132r and locked again by the hook portion 132f of the lock mechanism 132. The moving portion 143 returns to the original position (near-side position) P1 (refer to FIG. 19) with the pivoting of the lock mechanism 132.

As described above, when the moving portion 143 exists at the near-side position P1, electric current is applied to the electromagnet, and the moving portion 143 moves to the far-side position P2 (FIG. 20). Also, when the moving portion 143 exists at the far-side position P2, the lock pin 126 is inserted into the concave portion 132u while moving downward with the pressing operation by the user, and the lock mechanism 132 pivots. Then, with the pivoting of the lock mechanism 132, the lock pin 126 is locked by the hook portion 132f again as well as the moving portion 143 returns to the near-side position P1 again (FIG. 21). That is, the "near-side position P1" functions as a locking position at which the lock pin is locked. The "far-side position P2" functions as a lock releasing position at which the lock of the lock pin is released as well as functions also as a receiving position at which the lock pin is received again. Accordingly, the locked state and the lock-released state are selectively switched according to two positions P1, P2 in the moving portion 143.

However, in the flash mechanism having the above structure, the moving portion 143 of the drive means sometimes returns from the far-side position P2 (refer to FIG. 20) to the original position (near-side position) P1 (refer to FIG. 19) due to some circumstances such that a shock is given to the camera, though the flash light emitting portion still exists at the light emitting position. In such case, as shown in FIG. 22, with the return of the moving portion 143 to the near-side position P1, the lock mechanism 132 also pivots counterclockwise about a lock shaft 135 and returns to the original position. At this time, even when the lock pin 126 moves downward with the downward movement of the flash light emitting portion, it is difficult that the lock mechanism 132 pivots counterclockwise and that the lock pin 126 is inserted into the concave portion (locking part) 132u of the lock mechanism 132. This is because the moving portion 143 has already returned to the most backward side (the right side in the drawing) and further movement is difficult, as well as because transmission force transmitted from the lock pin 126 to the lock mechanism 132 chiefly includes a component directed to the lock shaft 135, therefore, a component contributed to the pivoting about the lock shaft 135 in the transmission force is relatively small.

In this case, "near-side position" (P1) does not function as the receiving position at which the lock pin 126 is received again into the concave portion 132u of the lock mechanism 132, therefore, it is difficult to lock the lock pin 126 in the concave portion 132u. As a result, there is a problem that it is difficult to hold the flash light emitting portion in the housed position.

Thus, it is desirable to provide a technique which is capable of reducing power consumption as well as capable of locking the flash light emitting portion reliably at the time of housing the flash light emitting portion.

According to a first embodiment of the invention, there is provided an imaging apparatus including a flash light emitting portion moving between a housed position and a light emitting position, a biasing means for biasing the flash light emitting portion toward the light emitting position, a member to be locked moving with a movement of the flash light emitting portion, a locking means which has a first member and a second member, for locking the member to be locked in a state in which the flash light emitting portion exists at the housed position and suppressing change of the position of the flash light emitting portion, opposing a biasing force by the biasing means and a lock releasing means which has an electromagnet and a moving portion moving with respect to the electromagnet, for releasing a locked state of the member to be locked by the locking means by moving the moving portion from a first position to a second position in a direction apart from the electromagnet by applying electric current to the electromagnet and by allowing the locking means to pivot about a first axis, in which, when the locked state of the member to be locked is released by the lock releasing means, the flash light emitting portion moves to the light emitting position due to the biasing force by the biasing means, in which, when a housing operation of the flash light emitting portion is performed in a first state in which the locked state is released and in which the moving portion exists at the second position, the member to be locked moves downward while touching the first member with the housing operation, the locking means pivots about the first axis due to a force transmitted from the member to be locked to the first member as well as the moving portion returns from the second position to the first position and the locking means locks the member to be locked again, and in which, when the housing operation of the flash light emitting portion is performed in a second state in which the locked state is released and in which the flash light emitting portion still exists at the light emitting position though the locking means has pivoted about the first axis and the moving portion has returned from the second position to the first position, the member to be locked moves downward while touching the second member with the housing operation, the second member swings about a second axis which is different from the first axis due to a force transmitted from the member to be locked to the second member and the locking means locks the member to be locked again.

According to a second embodiment of the invention, there is provided an imaging apparatus including a flash light emitting portion moving between a housed position and a light emitting position, a biasing means for biasing the flash light emitting portion toward the light emitting position, a member to be locked moving with a movement of the flash light emitting portion, a locking means which has a first member and a second member, for locking the member to be locked in a state in which the flash light emitting portion exists at the housed position and suppressing change of the position of the flash light emitting portion, opposing a biasing force by the biasing means and a lock releasing means which has an electromagnet and a moving portion moving with respect to the electromagnet, for releasing a locked state of the member to be locked by the locking means by moving the moving portion from a first position to a second position in a direction apart from the electromagnet and allowing the locking means to pivot about a first axis, in which, when the locked state of the member to be locked is released by the lock releasing means, the flash light emitting portion moves to the light emitting position due to the biasing force by the biasing means, and in which, when a housing operation of the flash light emitting portion is performed in a state in which the locked state is released and in which the flash light emitting portion still exists at the light emitting position though the locking means has pivoted about the first axis and the moving portion has returned from the second position to the first position, the member to be locked moves downward while touching the second member with the housing operation, the second member swings about a second axis which is different from the first axis with respect to the first member due to a force transmitted from the member to be locked to the second member and the locking means locks the member to be locked again.

According to a third embodiment of the invention, there is provided an imaging apparatus including a flash light emitting portion moving upward and downward between a housed position and a light emitting position, a first biasing member biasing the flash light emitting portion toward the light emitting position, a lock pin moving with a upward-and-downward movement of the flash light emitting portion, a lock mechanism which has a first member and a second member, locking the lock pin in a state in which the flash light emitting portion exists at the housed position and suppressing change of the position of the flash light emitting portion, a second biasing member biasing the lock mechanism so as to pivot about a first axis in a given direction, a drive portion having a moving portion connected to the lock mechanism and moving with respect to an electromagnet, moving the moving portion from a first position to a second position in a direction apart from the electromagnet by applying electric current to the electromagnet and allowing the lock mechanism to pivot about a first axis, in which, when the moving portion moves from the first position to the second position, the first member and the second member pivot about the first axis due to a biasing force by the second biasing member to release the lock of the lock pin, and the flash light emitting portion moves upward to the light emitting position due to a biasing force by the first biasing member, in which, when a housing operation of the flash light emitting portion is performed in a first state in which the lock of the lock pin is released and in which the moving portion exists at the second position, the lock pin moves downward while touching the first member with the housing operation, the first member and the second member pivot about the first axis due to a force transmitted from the lock pin to the first member as well as the moving portion moves from the second position to the first position and the locking mechanism locks the lock pin again, and in which, when the housing operation of the flash light emitting portion is performed in a second state in which the lock of the lock pin is released and in which the flash light emitting portion still exists at the light emitting position though the first member and the second member have pivoted about the first axis and the moving portion has returned from the second position to the first position, the lock pin moves downward while touching the second member with the housing operation, the second member pivots about a second axis due to a force transmitted from the lock pin and moves in a direction apart from the lock pin, after that, the second member pivots and moves in a reverse direction by the biasing force of the second biasing member, and the lock mechanism locks the lock pin again.

According to the embodiments of the invention, it is possible to reduce power consumption as well as to lock a flash light emitting portion reliably at the time of housing the flash light emitting portion.

DESCRIPTION OF THE PREFERRED EMBODIMENTS

Hereinafter, an embodiment of the invention will be explained with reference to the drawings.

<1. Whole Structure>

Figure 1:
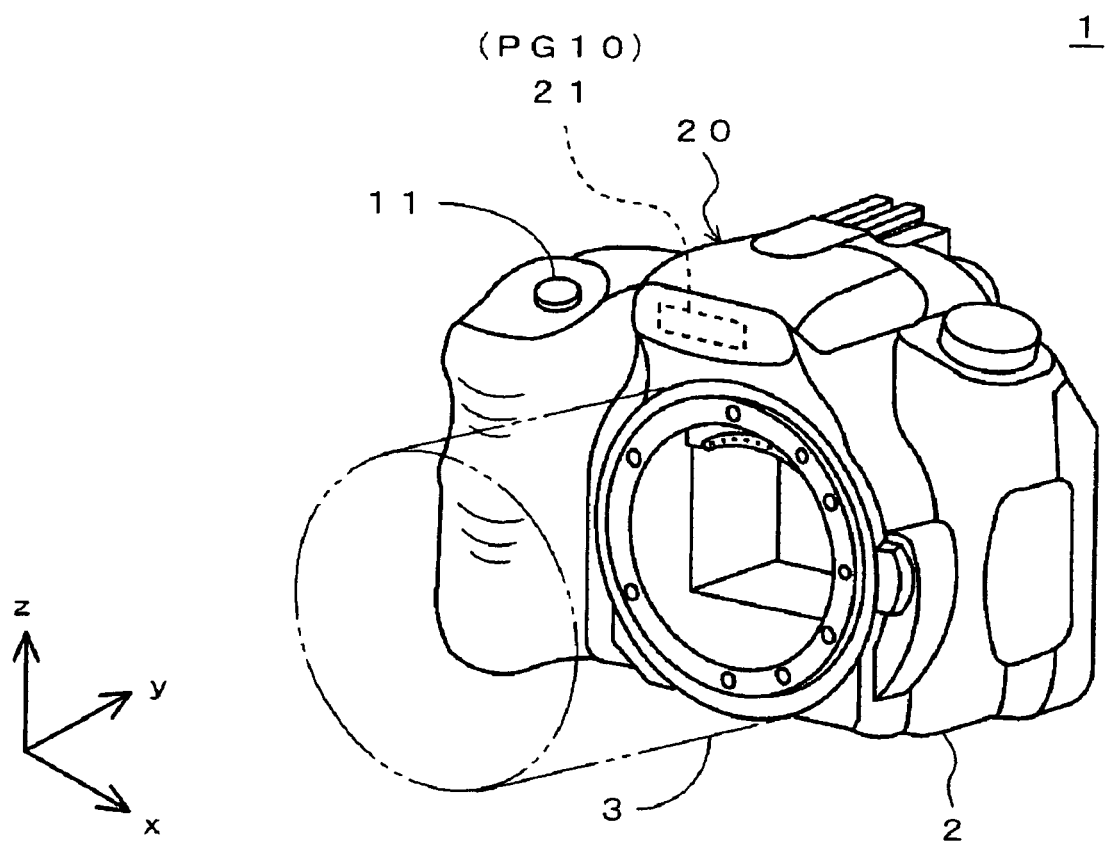
FIG. 1 is a perspective view showing an outer structure of an imaging apparatus.

FIG. 1 is a perspective view showing an outer structure of an imaging apparatus 1 according to an embodiment of the invention. The imaging apparatus 1 is formed as a lens-exchange single lens reflex-type digital camera.

As shown in FIG. 1, the imaging apparatus 1 includes a camera body portion (camera body) 2. An exchange-type imaging lens unit (exchange lens) 3 is detachable to the camera body portion 2. For convenience of showing the drawing, FIG. 1 shows a state in which the imaging lens unit 3 is detached, however, the imaging apparatus 1 is used in a state in which the imaging lens unit 3 is attached at the time of actually taking images.

At an upper surface of a grip portion of the camera body portion 2, a release button 11 for indicating the start of exposure is provided.

The release button 11 is a two-stage detection button which can detect two states of a half-pressed state (S1 state) and a completely-pressed state (S2 state). When the release button 11 is half pressed and in the S1-state, a preparation operation for acquiring a still image for recording (actual taken image) concerning a subject (for example, an AF control operation, an AE control operation and the like) is performed. When the release button 11 is further pressed and is in the S2-state, a taking operation of the actual taken image (a series of operation in which an exposure operation concerning a subject image (optical image of the subject) is performed by using an imaging device and prescribed image processing is performed to an image signal obtained by the exposure operation) is performed.

At an upper surface side of the camera body portion 2, a pop-up type flush mechanism 20 is provided so as to be housed. The flash mechanism 20 includes a flash light emitting portion 21 (FIG. 2) which is used when luminance of the subject is insufficient and the like. The imaging apparatus 1 controls light emission of the flash light emitting portion 21 by a flash control circuit, a whole control unit and the like included in the camera body portion 2.

Figure 2:
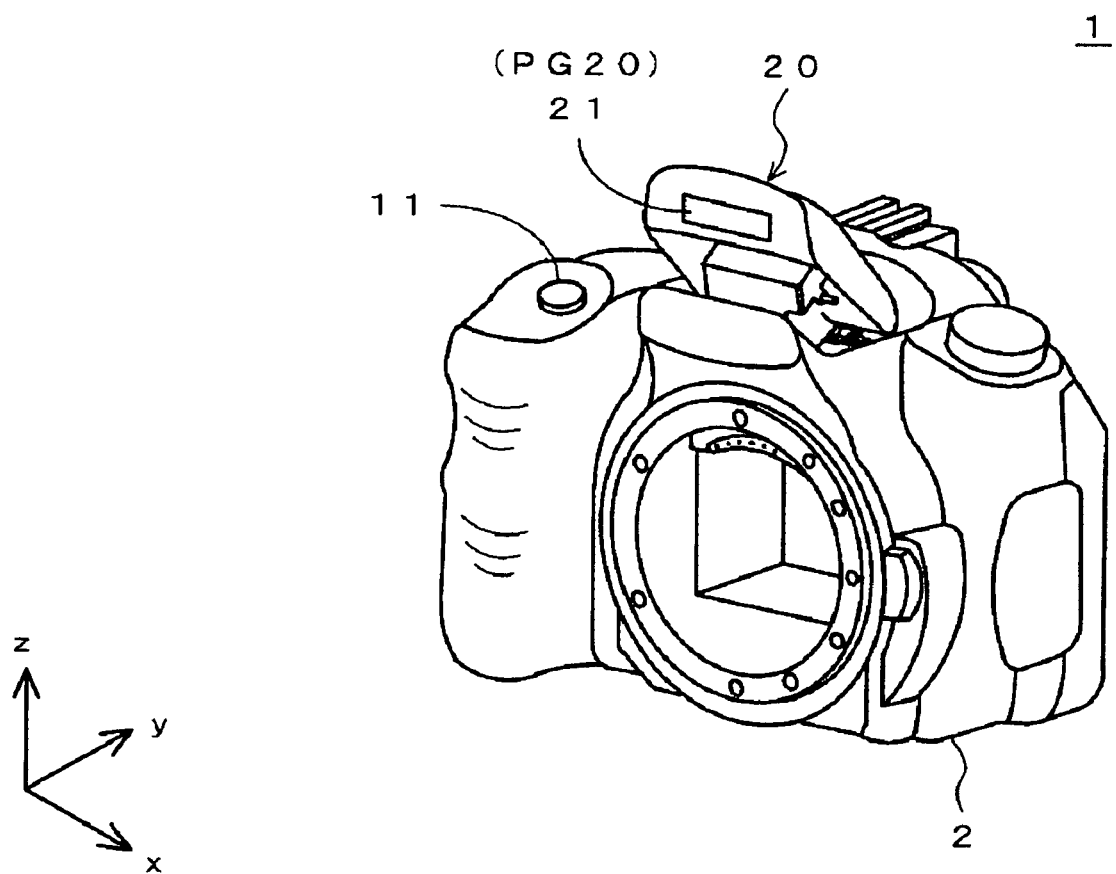
FIG. 2 is a perspective view showing an outer structure of the imaging apparatus (pop-up state)

A flash mechanism 20 is formed so as to be switched between a state in which the flash light emitting portion 21 is housed (housed state) (refer to FIG. 1) and a state in which the flash light emitting portion 21 is popped up (pop-up state) (refer to FIG. 2). In other words, the flash mechanism 20 can allow the flash light emitting portion 21 to move upward and downward with respect to the camera body portion 2, more specifically, the mechanism can allow the flash light emitting portion 21 to move upward and downward between a housed position PG10 (refer to FIG. 1) and a light emitting position PG20 (refer to FIG. 2).

Particularly, the imaging apparatus 1 can pop up the flash light emitting portion 21 of the flash mechanism 20 so as to be the state shown by FIG. 2. Specifically, the release button 11 is half-pressed and the AE control operation is performed, and when it is determined that flash light emission is necessary, the flash light emitting portion 21 of the flash mechanism 20 is automatically popped up. When the release button 11 is completely pressed (S2 state), the flash light emitting portion 21 emits light to illuminate the subject as well as the actual taking operation (exposure operation) is executed. The flash light emitting portion 21 in the pop-up state is moved into the housed state due to the pressing operation by the operator and housed at an upper part of the camera body portion 2. The operation will be described later.

<2. Flash Mechanism>

Figure 3:
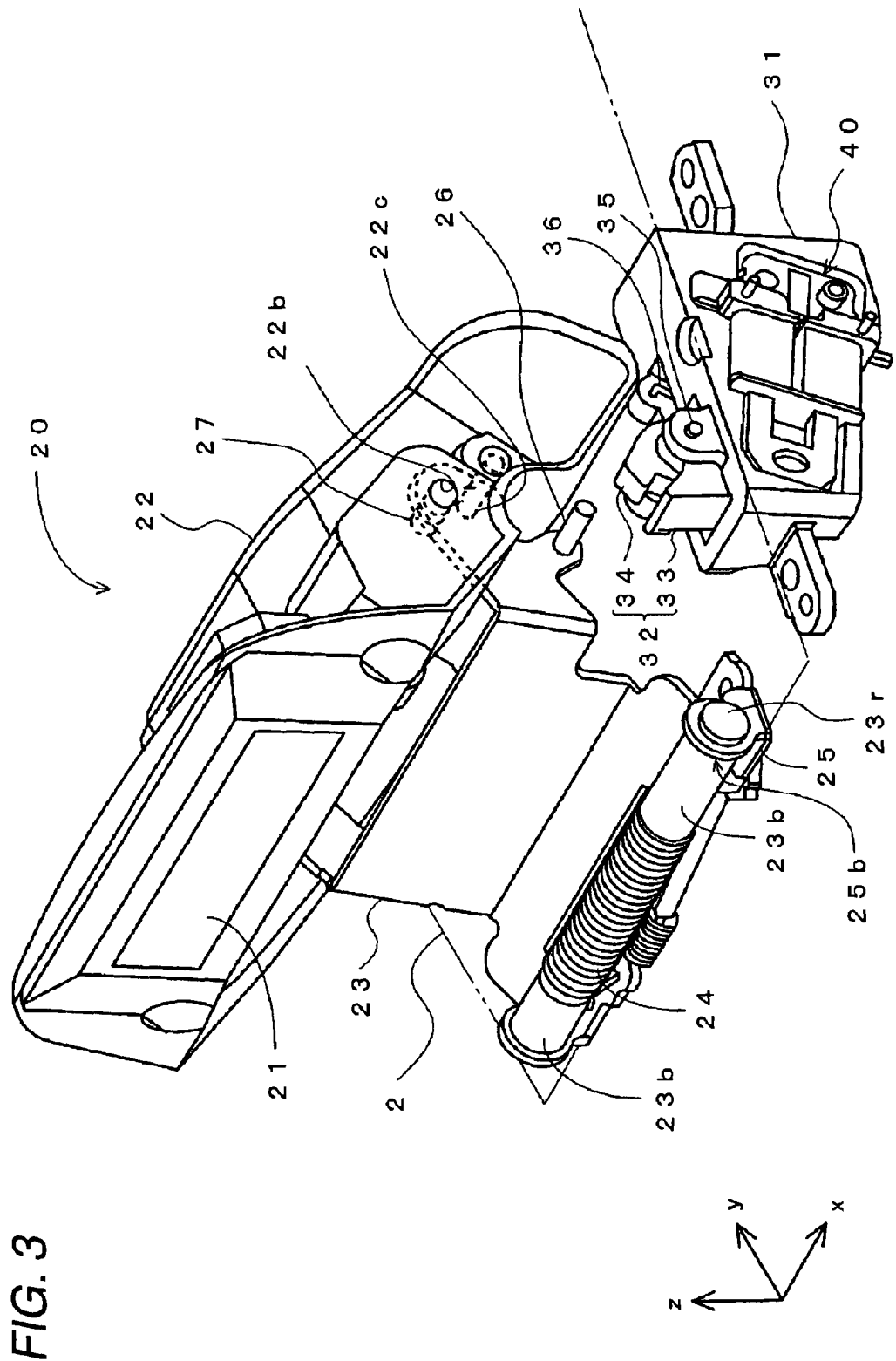
FIG. 3 is a perspective view showing an internal structure in the vicinity of a flash mechanism.
Figure 4:
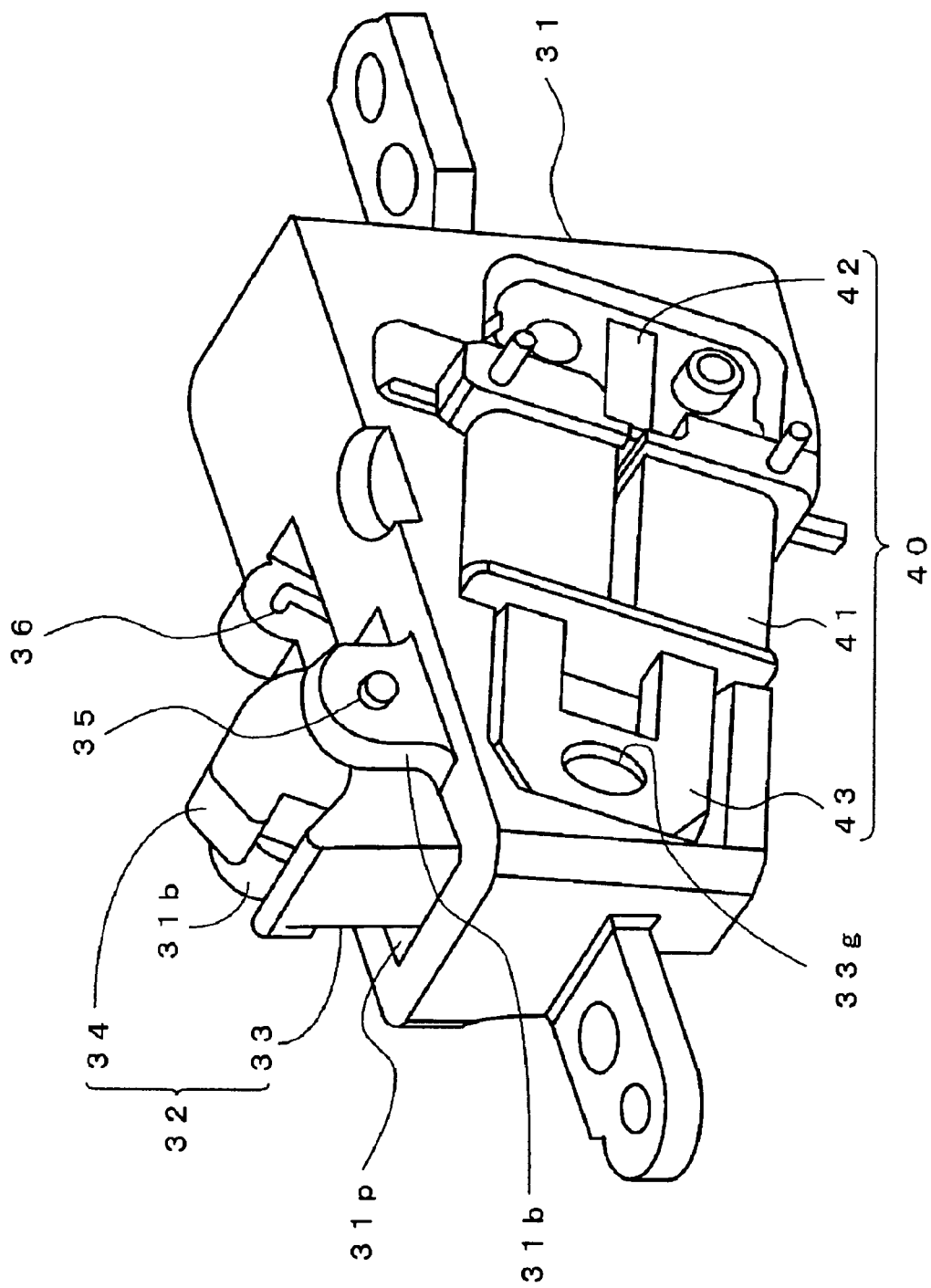
FIG. 4 is an enlarged view showing a part of FIG. 3.

FIG. 3 is a perspective view showing an internal structure in the vicinity of the flash mechanism 20 of the imaging apparatus 1. FIG. 4 is a perspective view shown by enlarging part of FIG. 3. In respective drawings, components are appropriately omitted for simplifying the drawings.

As shown in FIG. 3, the flash mechanism 20 includes the flash light emitting portion 21, a base cover 22, an arm portion 23, a pop-up spring 24, a holding plate 25, a lock pin 26 and a shaft member 27.

The flash light emitting portion 21 is fixed at a front part of the base cover 22, and the holding plate 25 is fixed at an upper part of the camera body portion 2.

The arm portion 23 is a connection member connecting the base cover 22 and the holding plate 25. The arm portion 23 includes a cylinder portion 23b at one end side (holding plate side). A shaft member 23r is pierced through the cylinder of the cylinder portion 23b, and the shaft member 23r is pivotally supported by a bearing portion 25b of the holding plate 25. The arm portion 23 can be pivoted about the center axis of the shaft member 23r. At the other side of the arm portion 23 (base cover side), namely, at a periphery side of the arm portion 23 which can be pivoted, the lock pin 26 and the shaft member 27 are fixed at the arm portion 23.

The shaft member 27 is pivotally supported by a bearing portion 22b of the base cover 22. At a further back-end side of the base cover 22, a guide pin 22c is provided, and at a position facing the guide pin 22c in the upper part of the camera body portion 2, a guide groove 2d (not shown) guiding the guide pin 22c is grooved.

When the arm portion 23 is pivoted (counterclockwise) and the shaft member 27 moves upward, the guide pin 22c of the base cover 22 slides in the front direction with respect to the guide groove 2d of the camera body portion side, as well as the base cover 22 is pivoted (clockwise) about the center shaft of the shaft member 27. Accordingly, at the time of pop-up operation of the flash light emitting portion 21, the back-end side of the base cover 22 moves forward, while the flash light emitting portion 21 moves upward. When the guide pin 22c reaches the front-side end portion of the guide groove 2d, the flash light emitting portion 21 moves upward to a predetermined height position and the upward movement is stopped. The stop position (PG20) of the flash light emitting portion 21 is a position where light emission of the flash light emitting portion 21 is performed, also referred to as a light emitting position (PG20).

When the reverse operation is performed, that is, when the arm portion 23 is pivoted in the reverse direction (clockwise) and the shaft member 27 moves downward, the base cover 22 is pivoted in the reverse direction about the center axis of the shaft member 27, while the guide pin 22c slides in the reverse direction (backward direction) with respect to the guide groove 2d. Accordingly, the back-end side of the base cover 22 moves backword, while the flash light emitting portion 21 moves downward. The flash light emitting portion 21 moves downward to a predetermined position PG10, housed in the state locked by a later-described lock mechanism 32 and the like.

The lock pin 26 is provided at a position lower than the shaft member 27 so as not to interfere with the base cover 22. The lock pin 26 moves with the pivoting movement (upward-and-downward movement) of the arm portion 23, in other words, the upward-and-downward movement of the flash light emitting portion 21. The lock pin 26 is locked by the lock mechanism 32 at the housed position PG 10 (refer to FIG. 1) of the flash light emitting portion 21. Accordingly, the position change of the flash light emitting portion 21 is suppressed and the housed state of the flash light emitting portion 21 is maintained. That is, the lock mechanism 32 locks the lock pin 26 and suppresses the position change of the flash light emitting portion 21 in the state in which the flash light emitting portion 21 exists at the housed position PG 10. Accordingly, the lock pin 26 is also referred to as a member to be locked and the lock mechanism 32 is referred to as a locking portion which locks the member to be locked 26.

The pop-up spring 24 is provided between the arm portion 23 and the holding plate 25. The pop-up spring 24 biases the flash light emitting portion 21 toward the light emitting position PG 20 (FIG. 2) at any time. In other words, biasing force in the upward direction (refer to an arrow AZ in FIG. 11) is applied to the arm portion 23 by elastic force of the pop-up spring 24.

Figure 10:
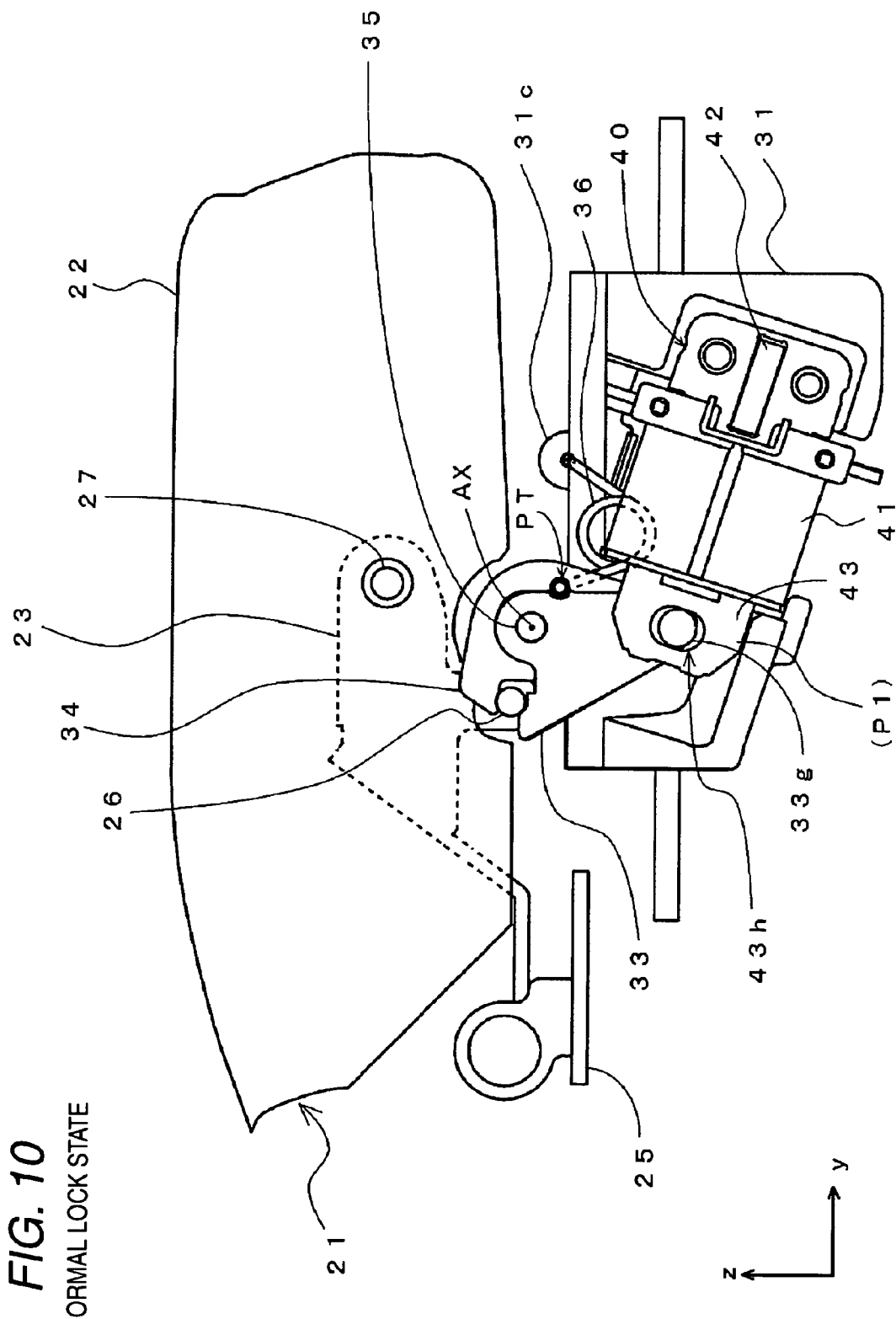
FIG. 10 is a side sectional view showing a housed state of a flash light emitting portion.

In the state in which the flash light emitting portion 21 is housed, the lock mechanism 32 locks the lock pin 26 and suppresses the position change of the flash light emitting portion 21, opposing the biasing force by the pop-up spring 24 (refer to FIG. 10). On the other hand, when the lock by the lock mechanism 32 is released (when the locked state by the lock pin 26 is released), the lock pin 26 and the shaft member 27 move upward in the direction of the arrow AZ (refer to FIG. 11) according to the biasing force by the pop-up spring 24.

The flash mechanism 20 further includes a lock holder 31, the lock mechanism 32, a lock shaft 35, a spring 36 and a drive portion 40 (refer to FIG. 4). The lock mechanism 32 includes two members, specifically, a lock lever arm 33 and a lock lever 34.

The lock holder 31 is fixed to the camera body portion 2. In the lock holder 31, the lock lever arm 33, the lock lever 34, the spring 36 and the drive portion 40 are housed chiefly at an internal space thereof. An opening 31p is provided at an upper part of the lock holder 31.

The lock holder 31 includes bearing portions 31b at both end sides of the opening 31p in the right-and-left direction (X direction). The lock shaft 35 extending in the right-and-left direction over the opening 31p is pivotally supported by the two bearings 31b. The lock shaft 35 also pierces through the lock lever arm 33 and the lock lever 34 respectively, and the lock lever arm 33 and the lock lever 34 can pivot about the center shaft of the lock shaft 35.

Figure 5:
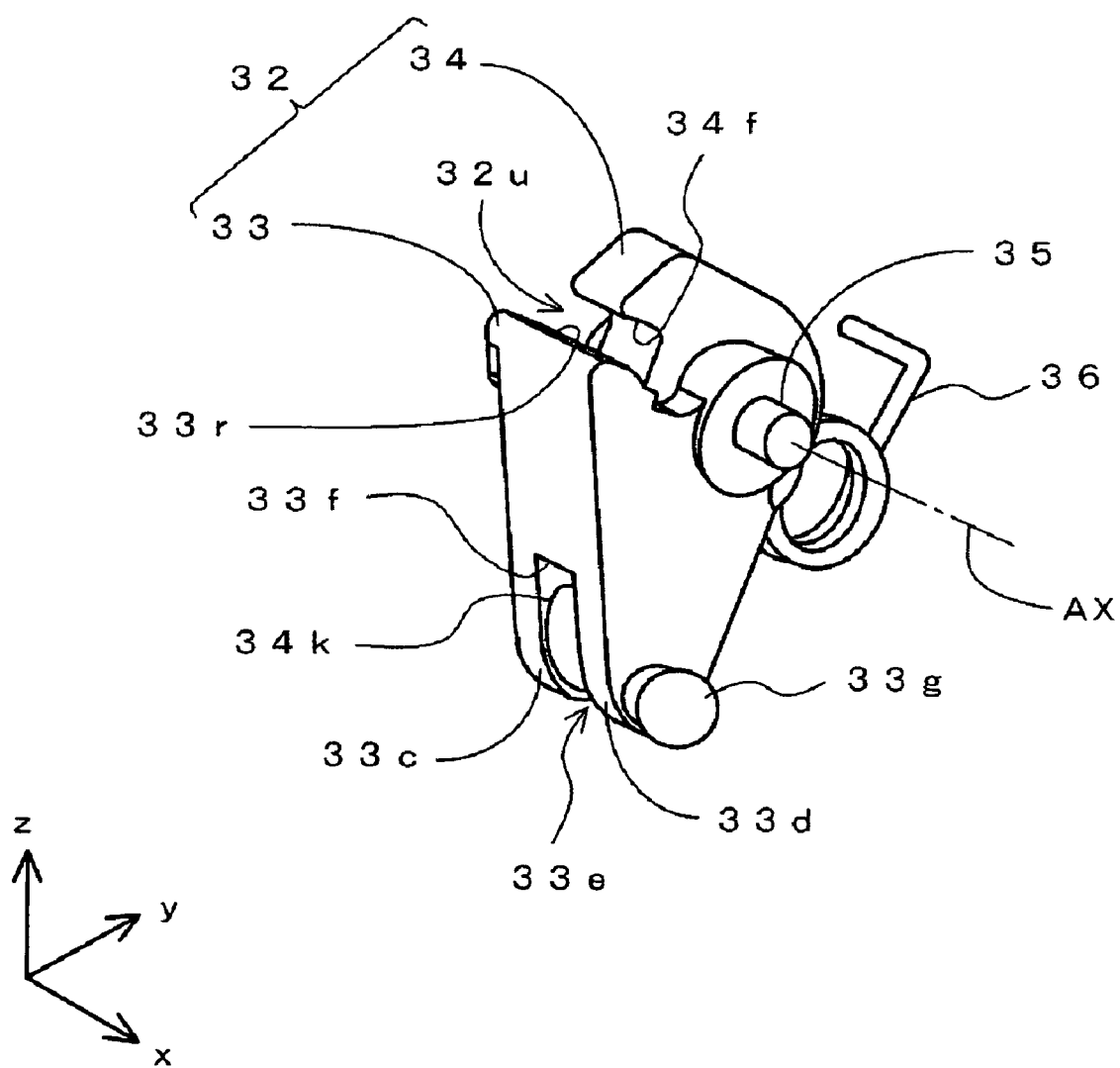
FIG. 5 is a perspective view showing a lock mechanism.
Figure 6:
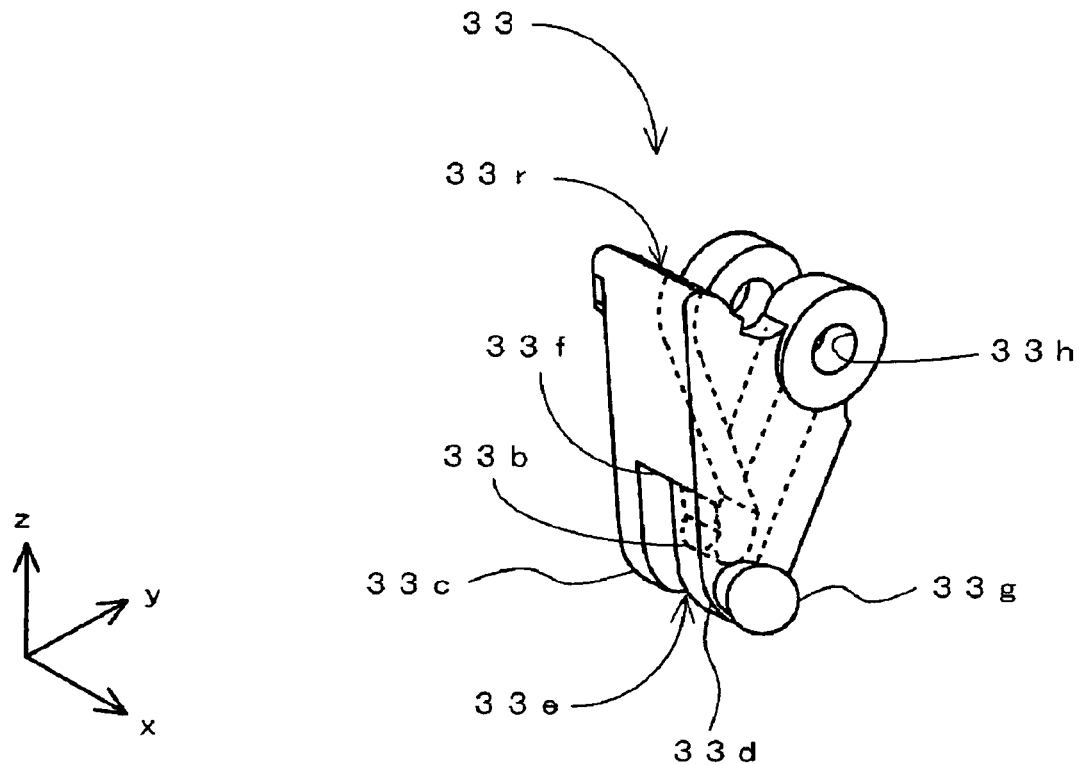
FIG. 6 is a perspective view showing a lock lever arm.
Figure 7:
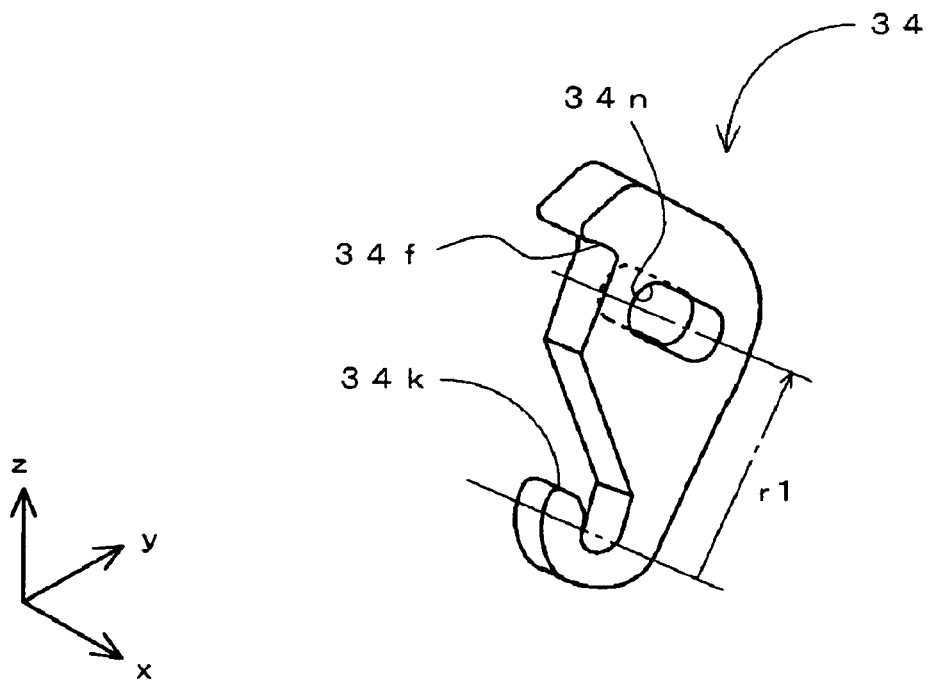
FIG. 7 is a perspective view showing a lock lever.

FIG. 5 is a perspective view showing the vicinity of the lock mechanism 32. FIG. 6 is a perspective view showing the lock lever arm 33 and FIG. 7 is a perspective view showing the lock lever 34.

As shown in FIG. 5 and FIG. 6, the lock lever arm 33 has a shape in which the lock lever 34 is sandwiched in a concave portion 33e formed as a gap portion between right-and-left side wall portions 33c, 33d. In detail, the lock lever arm 33 has an approximately U-shape having a concave portion at a back surface side (+Y side) of the camera when seen from the upper surface. The lock lever arm 33 has a shape in which the right-and-left side wall portions 33c, 33d are arranged with a predetermined gap from the front surface side to the back surface side of the camera seen from the lower surface.

The side wall portions 33c, 33d are connected to each other at a connection portion 33f at the upper part of the front surface side of the camera. The side wall portions 33c, 33d are connected to each other also at a shaft portion 33b at a lower part (FIG. 6). The shaft portion 33b is provided so as to extend in the right-and-left direction (X direction) at the gap portion of the lower side of the lock lever arm 33, connecting the side wall 33c, 33d to each other.

At an outer side of the side wall portion 33d of the lock lever arm 33, a projecting portion 33g having an approximately spherical shape is provided. The projecting portion 33g pierces through a hole 43h (refer to FIG. 8) provided at a tip of a later-described moving core 43 of the drive portion 40. The diameter of the projecting portion 33g is the same as the length of the hole 43h in the front-and-back direction, and the projecting portion 33g is arranged in a state of being positioned in the front-and-back direction of the hole 43h. As described later, the projecting portion 33g moves in the front-and-back direction with the movement of the moving core 43.

As shown in FIG. 7, the lock lever 34 includes a surrounding portion 34k having a hook shape, which partially surrounds the shaft portion 33b at the lower end side, more specifically, in the vicinity of the shaft portion 33b of the lock lever arm 33. After the assembly, the shaft portion 33b of the lock lever arm 33 is formed in a state of being fitted to the surrounding portion 34k of the lock lever 34, and the lock lever 34 can also pivot about an center axis BX of the shaft 33b of the lock lever arm 33 (refer to FIG. 17 and FIG. 18). The lock shaft 35 pieces through a guide hole 34n having a long hole shape provided at the lock lever 34, and when the pivoting movement about the shaft portion 33b is performed, the lock shaft 35 relatively moves with respect to the lock lever 34 along the guide hole (long hole) 34n. The guide hole 34n is provided at a position along an arc of a given radius r1 about the center axis of the shaft portion 33b in the lock lever 34.

The spring (specifically, a torsion spring) 36 is provided between a spring fixing portion 31c of the lock holder 31 and a given position PT (refer to FIG. 10) of the lock lever 34. The position PT is a position which is a lower side of the lock shaft 35 as well as a position which is an upper side of the shaft portion 33b, that is, between the lock shaft 35 and the shaft portion 33b. One end of the spring 36 is fixed to the spring fixing portion 31c and the other end of the spring 36 is fixed at the position PT of the lock lever 34. A biasing force toward a direction allowing the lock lever 34 apart from the spring fixing portion 31c (left direction in the drawing) is applied to the lock lever 34 by the spring 36 (specifically, an elastic force of the spring 36). According to the biasing force, the lock mechanism 32 (specifically, the lock lever arm 33 and the lock lever 34) intends to pivot (clockwise) about the center axis AX of the lock shaft 35.

As described later, when the lock lever 34 moves to the back surface side (+Y side) of the camera, the spring 36 applies a force allowing the lock lever 34 to return to the front surface side (−Y side) of the camera to the lock lever 34 (refer to FIG. 18). In other words, the spring 36 also applies a force allowing the lock lever 34 to pivot (counterclockwise) about the center axis BX of the shaft portion 33b to the lock lever 34.

Figure 8:
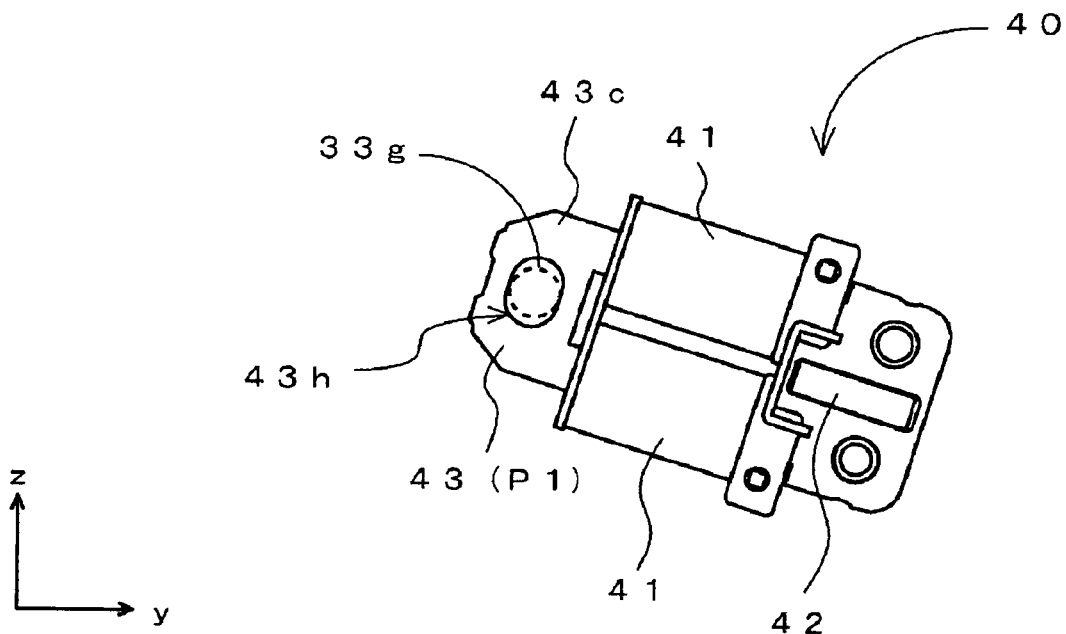
FIG. 8 is a view showing a state in which a moving core exists at a backward position.
Figure 9:
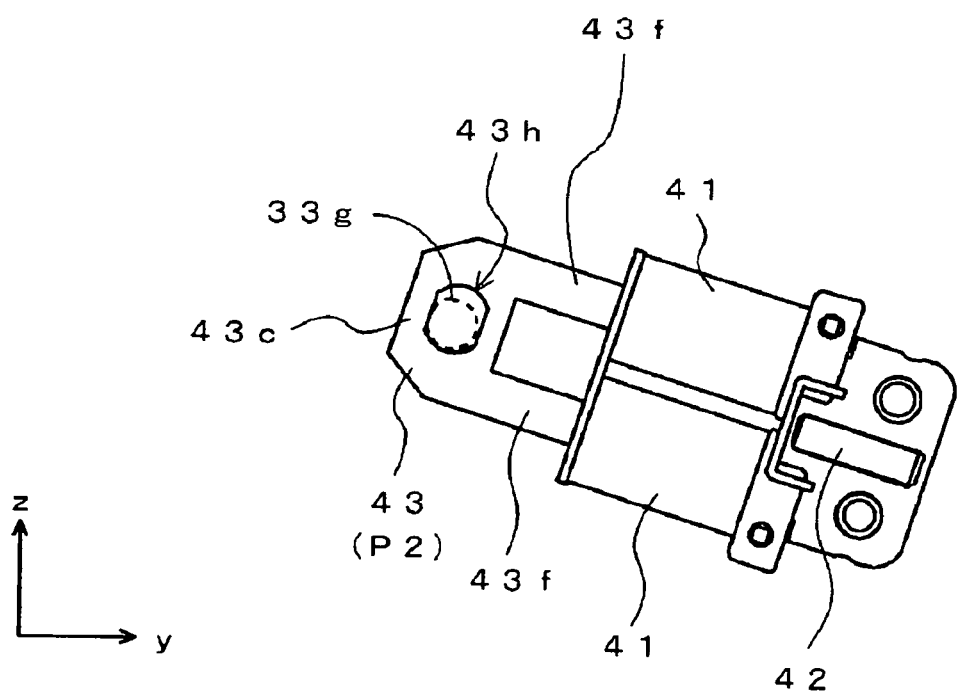
FIG. 9 is a view showing a state in which the moving core exists at a forward position.

As shown in FIG. 8, FIG. 9 and other drawings, the drive portion 40 includes an electromagnet (solenoid coil) 41, a permanent magnet 42 and the moving core 43. The moving core 43 includes a tip portion 43c and two leg portions 43f extending from the tip portion to the camera back surface side (+Y side), and the two leg portions 43f are inserted into a hollow of the electromagnet (solenoid coil) 41. The moving core 43 moves in the approximately front-and-back direction of the camera in accordance with magnitude relation between magnetic force and the like in the drive portion 40 and biasing force by the spring 36 according to a current application state with respect to the electromagnet 41. The moving core 43c can be expressed also as a moving portion of the drive portion 40. Conversely, the electromagnet 41 and the permanent magnet 42 can be expressed as fixed portions.

In addition, the hole 43h is provided at the tip side of the moving core 43, and the projecting portion 33g of the lock lever arm 33 is fitted to the hole 43h in a state so that movement in the approximately upward-and-downward direction is allowed. The projecting portion 33g and the hole 43h carry out a connection function, and the moving core 43 is connected to the lock lever arm 33. The moving core 43 works in conjunction with the lock lever arm 33. Specifically, forward and backward movements in the approximately front-and-back direction of the moving core 43 and a pivoting movement about the lock shaft 35 of the lock mechanism 32 (lock lever arm 33 and the lock lever 34) are performed in conjunction with each other.

The moving core 43 is fixed at a position P1 (also referred to as a backward position) which is relatively backward (refer to FIG. 8), opposing the biasing force by the spring 36 according to magnetic force (absorption force) of the permanent magnet 42 in the state in which current is not applied to the electromagnet 41.

When current is applied to the electromagnet 41 and a magnetic field which is reverse to the permanent magnet 42 is generated, a pulling force with respect to the moving core 43 (force of drawing the moving core 43 to the side of the permanent magnet 42) is reduced and the force opposing the biasing force by the spring 36 is reduced. Then, the biasing force by the spring 36 becomes relatively larger than the drawing force with respect to the moving core 43. Therefore, the lock mechanism 32 pivots clockwise about the lock shaft 35 as well as the moving core 43 moves in the direction apart from the electromagnet 41 and the permanent magnet 42 (refer to FIG. 11). In more detail, the lock lever arm 33 and the lock lever 34 integrally pivot clockwise about the lock shaft 35, and the projecting portion 33g of the lock lever arm 33 moves forward as well as the moving core 43 moves forward to a position which is relatively forward (also referred to as a forward position) P2 (FIG. 9). In this state, the locked state of the lock pin 26 by the lock mechanism 32 is released, and the flash light emitting portion 21 moves (rises) to the light emitting position by biasing force due to the pop-up spring 24. Accordingly, the drive portion 40 including the electromagnet 41 and the like can be expressed also as a lock releasing portion.

The backward position P1 of the moving core 43 is also referred to as the "near-side position" because it is the position relatively close to the electromagnet 41. In addition, the forward position P2 of the moving core 43 is referred to as the "far-side position" because it is the position relatively distant from the electromagnet 41.

<3. Operation>

Figure 11:
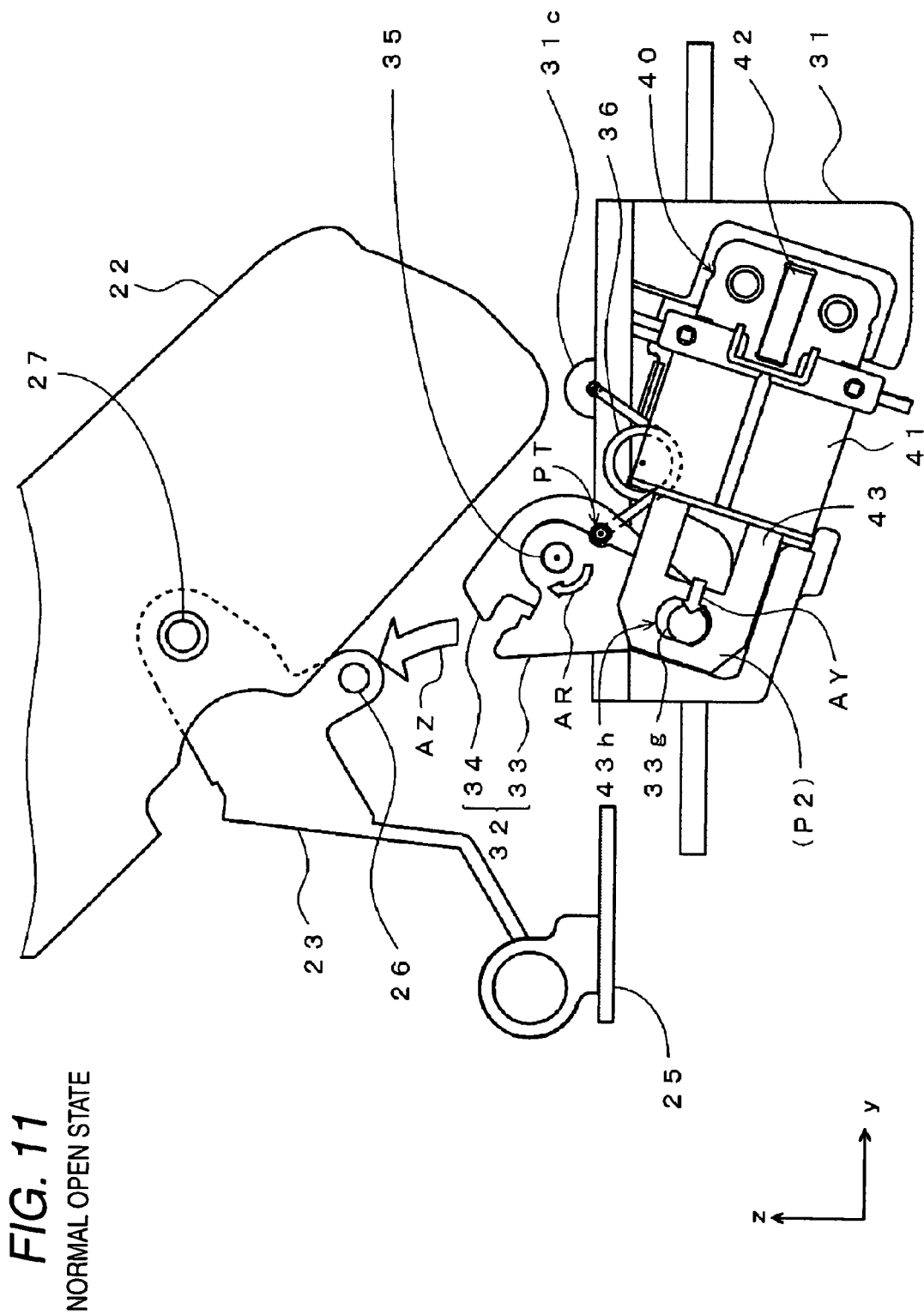
FIG. 11 is a side sectional view showing a pop-up state of the flash light emitting portion.
Figure 12:
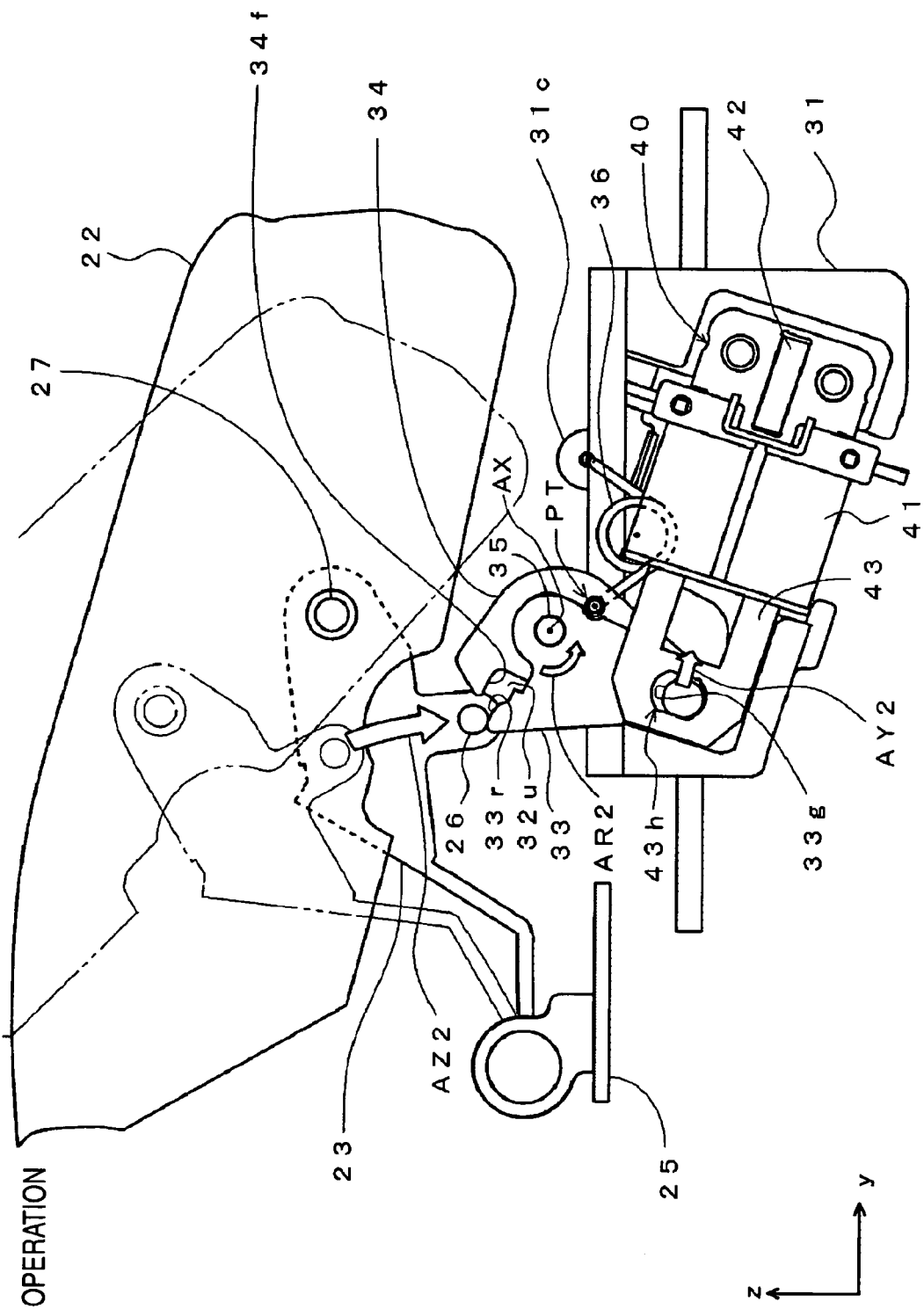
FIG. 12 is a side sectional view showing a normal housing operation of the flash light emitting portion.
Figure 15:
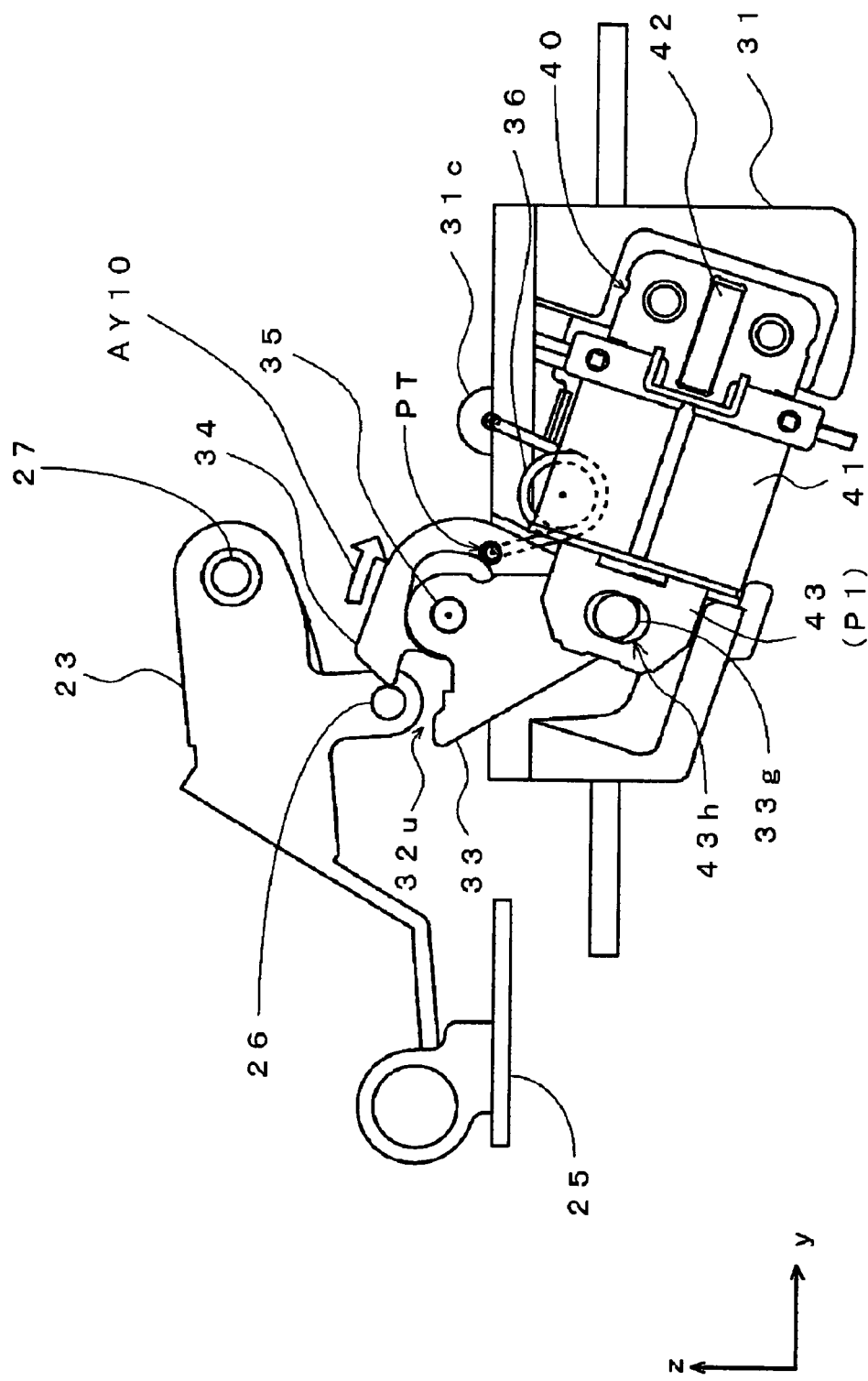
FIG. 15 is a view showing a state in which the lock pin further moves downward from a state of FIG. 14.
Figure 16:
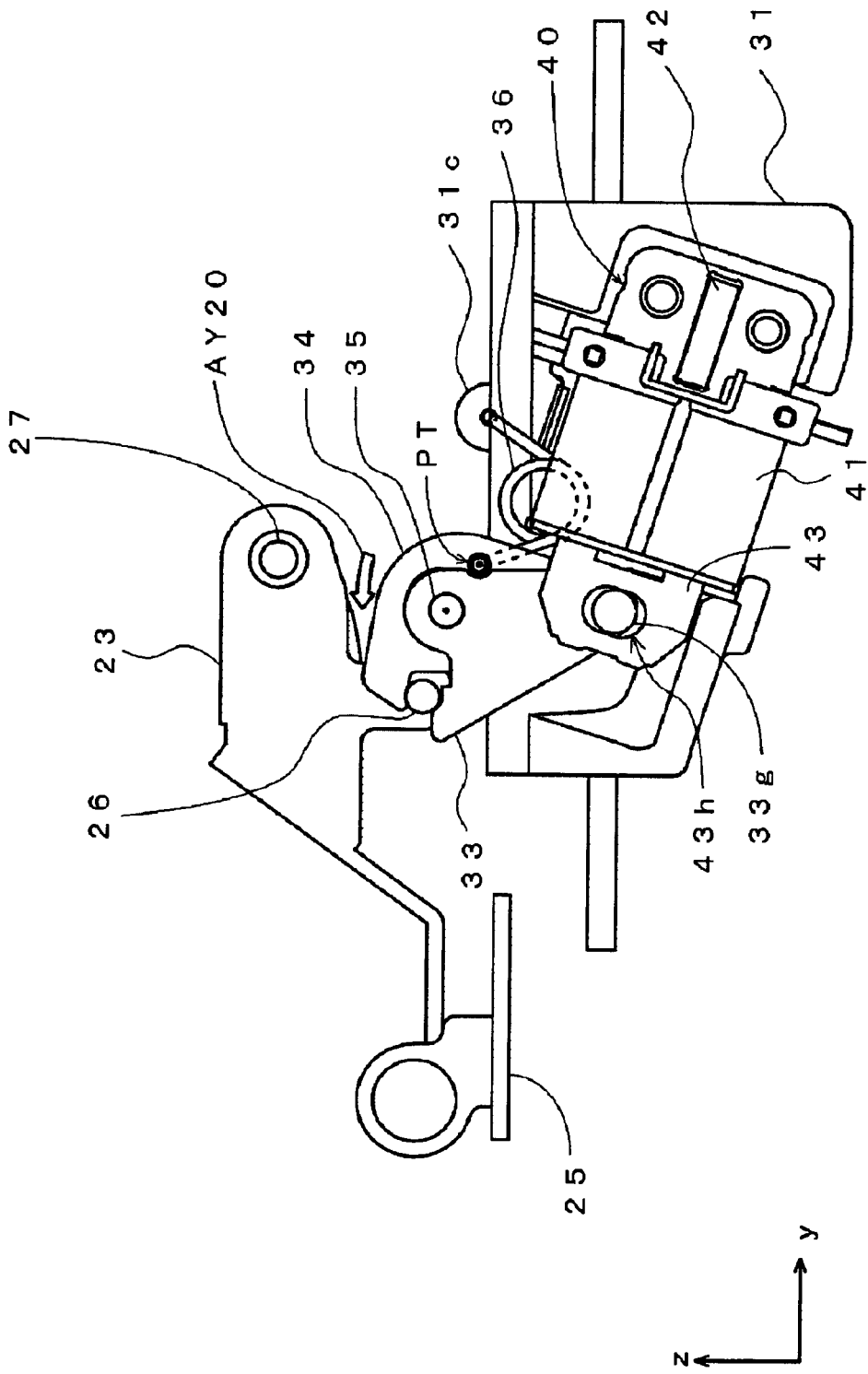
FIG. 16 is a view showing a state in which the lock pin further moves downward from a state of FIG. 15.
Figure 17:
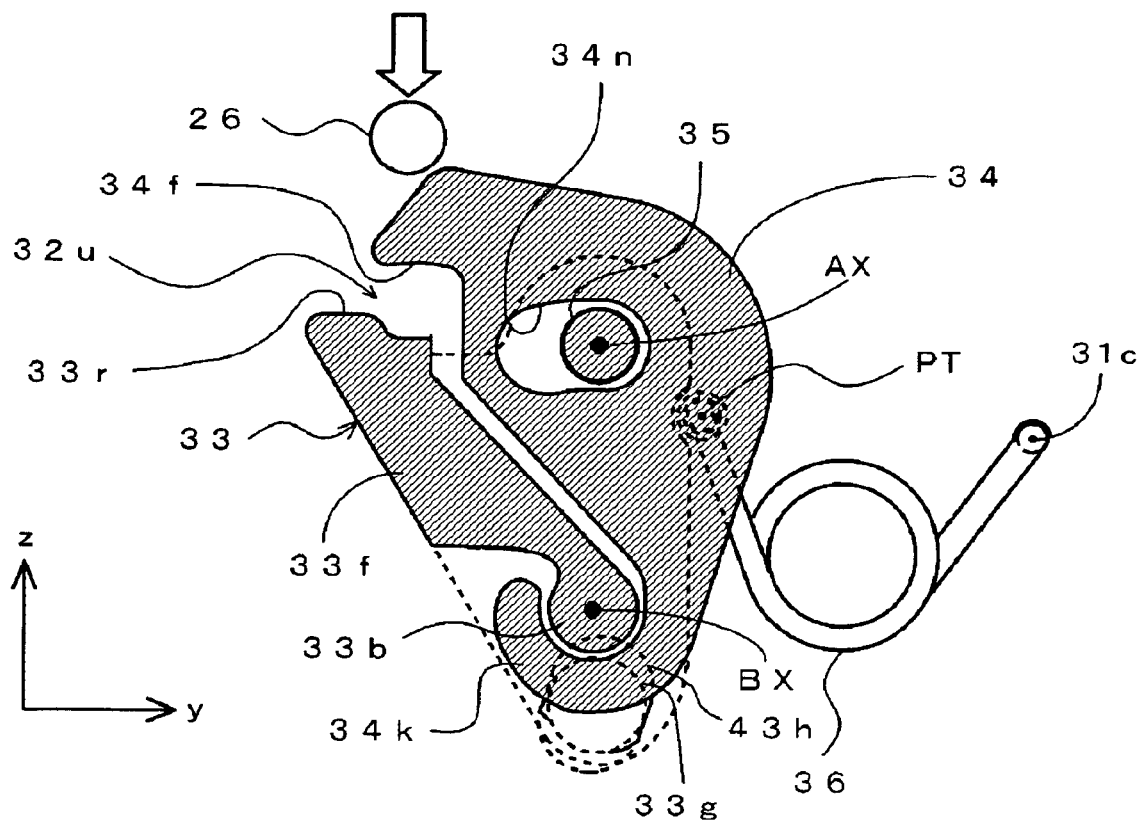
FIG. 17 is a partial sectional view corresponding to FIG. 14.

Next, the operation of the flash mechanism 20 will be explained with reference to FIG. 10 to FIG. 18 and other drawings. FIG. 10 is a side sectional view showing a state of housing the flash light emitting portion 21, in other words, a state in which the flash mechanism 20 is locked (also referred to as a locked state). FIG. 11 is a side sectional view showing a state in which the lock is released and the flash light emitting portion 21 is popped up (pop-up state). Also, FIG. 12 is a view showing a normal housing operation of the flash light emitting portion 21, and FIG. 13 to FIG. 16 are views showing housing operations of the flash light emitting portion 21 when the flash mechanism 20 is in abnormal states. In FIG. 13 to FIG. 16, the flash light emitting portion 21 and the base cover 22 and the like are not shown. Further, FIG. 17 is a partial sectional view corresponding to FIG. 14, and FIG. 18 is a partial sectional view corresponding to FIG. 15. FIG. 17 and FIG. 18 show respective cross sections of the connection portion 33f and the shaft portion 33b of the lock lever arm 33 as well as the lock lever 34 (refer to shaded areas) in a plane parallel to the YZ plane.

<3-1. Pop-Up Operation>

First, an operation of popping up the flash light emitting portion 21 will be explained with reference to FIG. 10 and FIG. 11.

In the locked state of FIG. 10 (FIG. 1), when the release button 11 is half pressed (S1 state), the AE control operation (automatic exposure control operation) is executed, and it is determined that the flash light emission is necessary, the flash light emitting portion 21 of the flash mechanism 20 is automatically popped up in accordance with the following operation.

Specifically, electric current is applied to the electromagnet in a state in which the moving core 43 exists at the backward position P1, thereby realizing the pop-up operation. First, when current is applied to the electromagnet (solenoid coil) 41 and a magnetic field which is the reverse direction to a magnet field of the permanent magnet 42 is generated, attracting force as the whole drive portion 40 with respect to the moving core 43, specifically, the force of drawing the moving core 43 to the side of the permanent magnet 42 becomes weak. As a result, the biasing force of the spring 36 becomes relatively larger than the attracting force by the drive portion 40, and the lock mechanism 32 pivots in the direction of an arrow AR (clockwise) as well as the moving core 43 moves from the backward position P1 to the forward position P2 (refer to FIG. 9) in the direction of an arrow AY as shown in FIG. 11. In detail, the lock lever arm 33 pivots clockwise about the lock shaft 35 integrally with the lock lever 34, and the projecting portion 33g of the lock lever arm 33 moves forward. Then, the moving core 43 moves forward to the forward position P2 with the movement of the projecting portion 33g in the forward direction.

In accordance with the pivoting movement and the like of the lock mechanism 32, the locked state of the lock pin 26 is released. Specifically, as shown in the arrow AZ of FIG. 11, the locked state of the lock pin 26 locked by the lock lever arm 33 and the lock lever 34 (chiefly by the hook portion 34f of the lock lever 34) is released, and the lock pin 26 moves upward by the upward biasing force of the pop-up spring 24.

The above operations are performed almost at the same time, thereby the flash light emitting portion 21 makes a transit to the pop-up state (refer to FIG. 2). The current application to the electromagnet 41 is ended just after the camera body portion 2 makes a transit to the pop-up state. Since the moving core 43 moves at the position (P2) distant from the permanent magnet 42 in the pop-up state, the attracting force received by the moving core 43 from the permanent magnet 42 is relatively weak, which is smaller than the biasing force due to the spring 36. Therefore, the moving core 43 usually does not return to the backward position P1 and keeps on existing at the forward position P2.

The current application to the electromagnet is performed only in a current application period of short time (for example, 0.5 seconds) for releasing the lock. The current application is not performed to the electromagnet in periods other than the current application period.

In this pop-up operation, the operation of allowing the moving portion existing relatively close to the electromagnet 41 to be apart (drag away) from the electromagnet 41 by the current application with respect to the electromagnet 41, therefore, relatively small current application is adequate, which can reduce power consumption.

<3-2. Normal Housing Operation>

After that, when the imaging with flash light emission, for example, in the pop-up state is completed, the flash light emitting portion 21 in the pop-up state moves to the housed state by the pressing operation by the operator and housed at the upper part of the camera body portion 2. Next, the housing operation will be explained. In this case, the normal housing operation will be explained with reference to FIG. 12.

When the operator determines that light emission by the flash light emitting portion 21 is not necessary (at the time of completing imaging), the operator performs an operation of pressing down upper cover members (the base cover 22, a top cover (not shown) provided so as to cover the base cover 22 and the like) (namely, the operation of pressing down the flash light emitting portion 21) by applying a force opposing the upward biasing force of the pop-up spring 24 for housing the flash light emitting portion 21. The base cover 22 moves downward with the pressing operation as well as the arm portion 23 and the lock pin 26 move downward respectively (refer to an arrow AZ2).

When the lock pin 26 moves downward to some degree, the lock pin 26 touches a tip portion 33r (also refer to FIG. 17) of the lock lever arm 33 as shown in FIG. 12. The tip portion 33r of the lock lever arm 33 functions as a receiving portion receiving the lock pin 26 which moves downward.

The pressing operation by the operator is further continued, and when the lock pin 26 intends to further move downward while touching the lock lever arm 33, an operational force by the operator is transmitted from the lock pin 26 to the lock lever arm 33. Then, torque (about the center axis AX of the lock shaft 35) acting on a contact point between the lock pin 26 and the receiving portion 33r according to the force transmitted to the lock lever arm 33 becomes larger than torque (about the lock shaft 35) due to the biasing force of the spring 36. As a result, the lock lever arm 33 pivots counterclockwise (in the direction of an arrow AR2) about the center axis AX of the lock shaft 35. At this time, the lock lever 34 also pivots counterclockwise about the lock shaft 35 integrally with the lock lever arm 33. With the pivoting of the lock mechanism 32, the lock pin 26 moves so as to be inserted toward the inside (deep side) of a concave portion 32*u* (refer to FIG. 5) while touching the receiving portion 33*r*. The concave portion 32*u* is a gap portion formed at a part sandwiched by the receiving portion 33*r* of the lock lever arm 33 and the hook portion 34*f* of the lock lever 34. At this time, the projecting portion 33*g* moves backward (in the direction of an arrow AY2) with the pivoting movement of the lock lever arm 33 as well as the moving core 43 returns to the backward position P1 (FIG. 8) with the backward movement of the projecting portion 33*g*.

Then, the lock pin 26 is locked to the lock mechanism 32 again with the counterclockwise pivoting movement and the like of the lock mechanism 32 (refer to FIG. 10). Specifically, the lock pin 26 is locked by the lock lever arm 33 and the lock lever 34 (chiefly by the locking portion inside the hook portion 34*f* of the lock lever 34). At this time, the flash light emitting portion 21 becomes in the state of being housed at a given position again (housed state).

At the time of the pop-up operation and the normal operation, the lock lever 34 pivots about the center axis AX of the lock shaft 35 in the state in which the lock shaft 35 exists at the position (refer to FIG. 17) of one end side (specifically, the back end side) of the guide hole 34*n* of the lock lever 34. At this time, the lock shaft 35 is positioned at the back end of the guide hole 34*n*, therefore, the lock lever 34 is controlled so as not to further move in the forward direction.

In the normal housing operation, the flash light emitting portion 21 returns to the housed state again as described above to be in the state in which the flash light emitting portion 21 is locked.

<3-3. Housing Operation at the Time of Abnormal States>

In the case that the flash light emitting portion 21 exists at the light emitting position PG20, the moving core 43 exists at the forward position P2 as shown in FIG. 11. Then, the housing operation as described above is performed.

Figure 13:
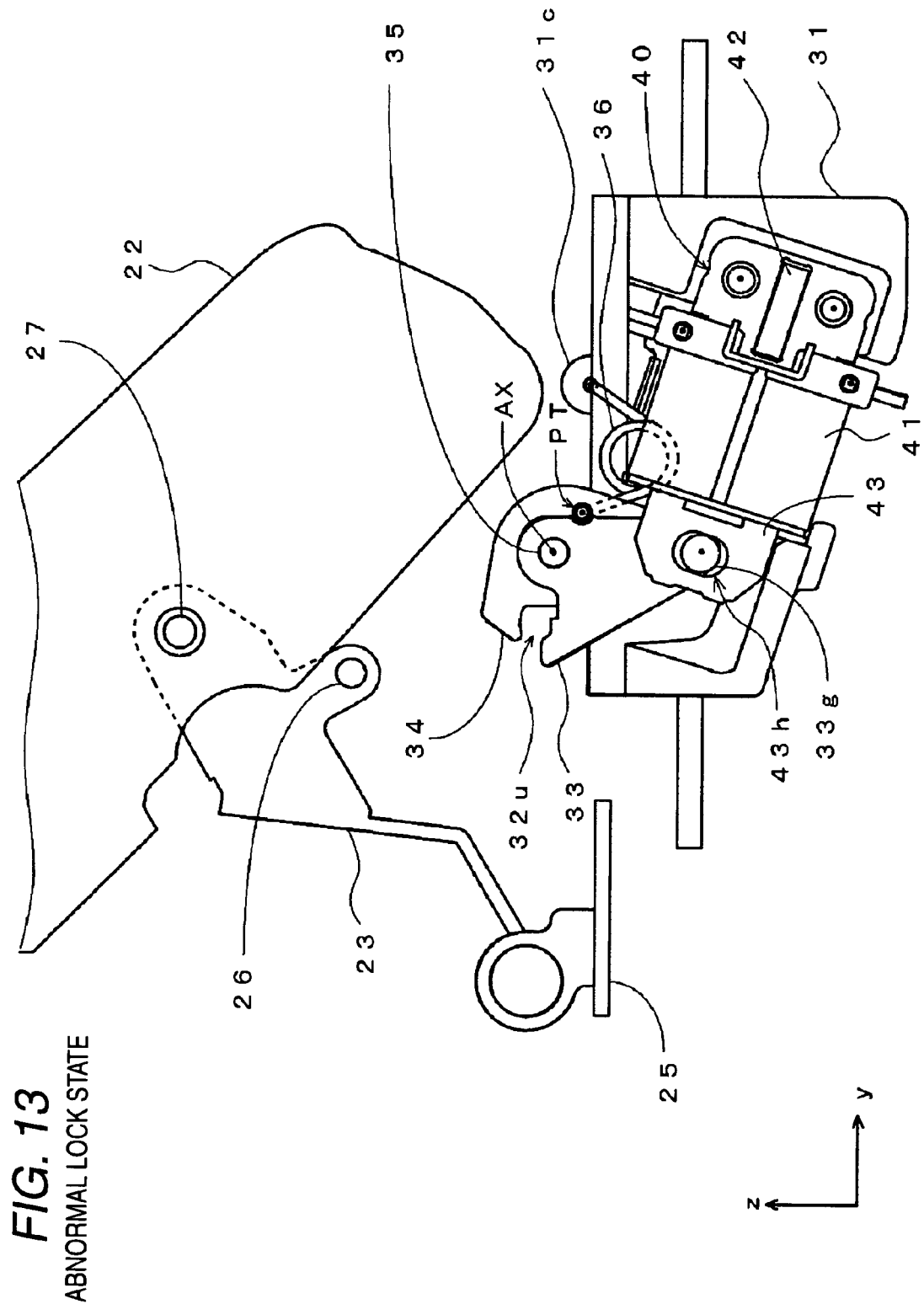
FIG. 13 is a side sectional view showing an abnormal state of the flash mechanism.
Figure 14:
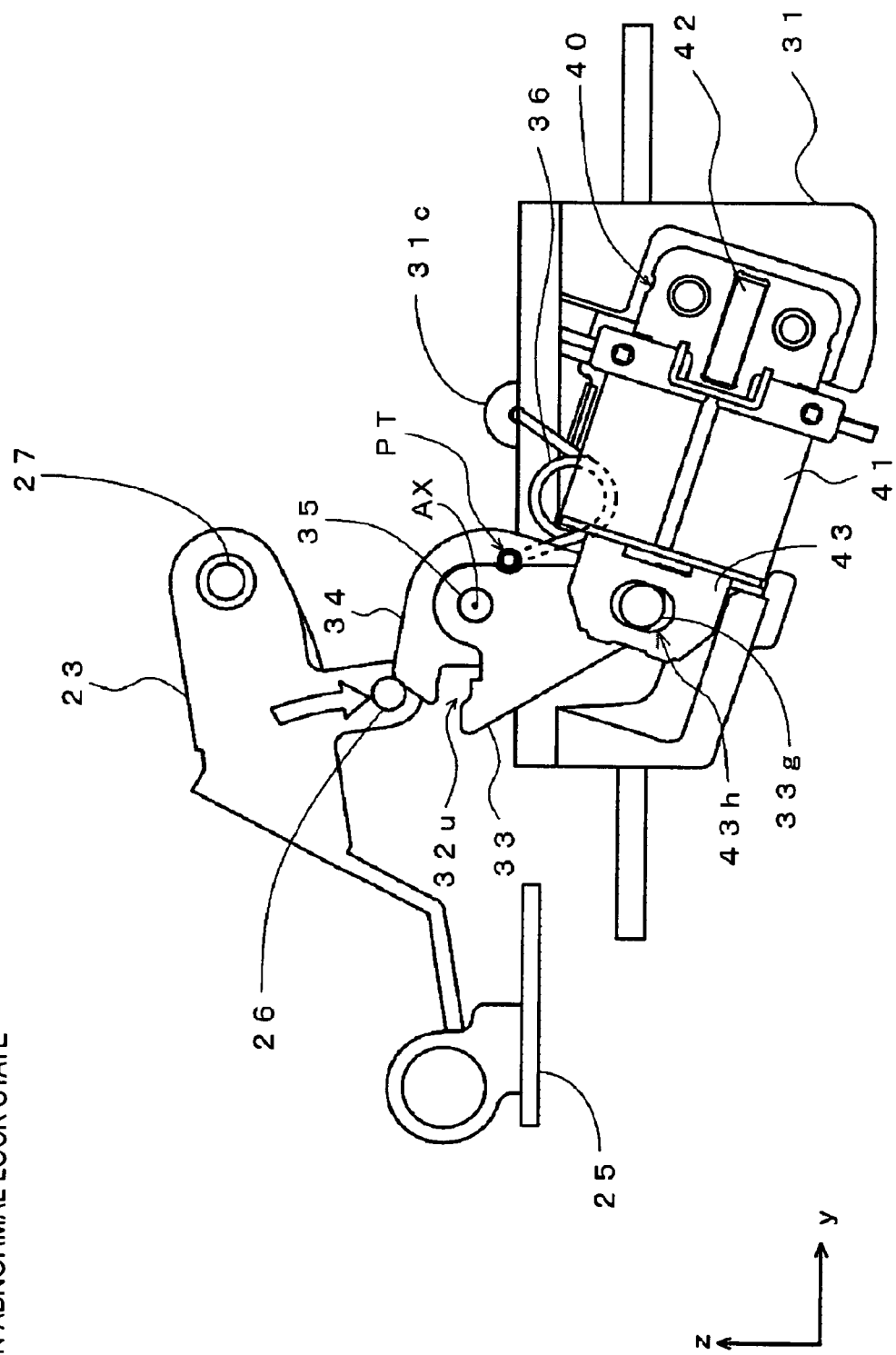
FIG. 14 is a view showing a state in which a lock pin moves downward in a state of FIG. 13.

However, when the imaging apparatus 1 receives a shock from outside (or the operator touches the lock lever arm 33 or the lock lever 34) and some other occasions, the moving core 43 sometimes returns to the backward position P1 from the forward position P2 due to the shock and the like though the flash light emitting portion 21 still exists at the light emitting position PG20 (in the same manner as FIG. 11) as shown in FIG. 13. In this case, the lock lever arm 33 and the lock lever 34 pivot counterclockwise about the center axis AX of the lock shaft 35, and the lock lever arm 33 and the lock lever 34 return to the same state as FIG. 10.

Then, in this state (refer to FIG. 13), a state that the operator performs the operation of pressing down the flash light emitting portion 21 for performing the housing operation of the flash light emitting portion 21 is assumed. In this state, when the lock pin 26 moves downward with the pressing operation, the lock pin 26 touches the "lock lever 34", not the lock lever arm 33 (refer to FIG. 14).

Here, a case in which the lock lever arm 33 and the lock lever 34 are completely integrated to form the lock mechanism 32 (that is, the case that it is difficult that the lock lever arm 33 and the lock lever 34 relatively move) is further assumed. Such structure corresponds to the above reference example.

In this case, the lock mechanism 32 has pivoted and the projecting portion 33*g* returns to the position which is the most backward side in the moving range thereof as well as the moving core 43 has already returned at the position P1 which is the most backward side. At this time, the moving core 43 is controlled so as not to further move to the backward side. In the force transmitted from the lock pin 26 to the lock lever 34, a component of the direction toward the lock shaft 35 is relatively large, however, a component of the direction vertical to the direction toward the lock shaft 35 (namely, a component contributed to the pivoting about the lock shaft 35) is relatively small.

In the returned state, when the lock mechanism 32 intends to pivot about the lock shaft 35 according to the downward movement of the lock pin 26, it is difficult that the lock mechanism 32 pivots about the lock shaft 35. In other words, it is difficult that the lock pin 26 enters the concave portion (locking portion) 32*u* formed so as to be sandwiched between the lock lever arm 33 and the lock lever 34 of the lock mechanism 32. Therefore, even when the lock pin 26 moves downward with the downward movement of the flash light emitting portion 21, it is difficult to lock the lock pin 26 by the lock mechanism 32 again. Specifically, it is difficult to hold the flash light emitting portion 21 in the housing position. Though it can be considered that an electric signal is applied to the drive portion 40 and the moving core 43 is moved to the forward position P2 again to avoid the above state, however, the operation for applying the electric signal to the drive portion 40 becomes necessary, which complicates the operation.

In response to this, the lock lever arm 33 and the lock lever 34 are not completely integrated and the lock lever 34 is formed so as to pivot about the center axis BX of the shaft portion 33*b* (FIG. 6) (also refer to FIG. 17 and FIG. 18) as described above in the embodiment. In other words, the lock lever 34 is also capable of pivoting about an axis (center axis BX of the shaft portion 33*b*) different from the center axis AX of the lock shaft 35 with respect to the lock lever arm 33.

When the lock pin 26 moves downward while touching the lock lever 34 with the housing operation of the flash light emitting portion 21 by the operator as shown in FIG. 14 (also refer to FIG. 17), a transmission force is acted on the lock lever 34 from the lock pin 26. When the transmission force is applied to the lock lever 34, the lock lever 34 pivots clockwise (in the direction of an arrow AY10) about the shaft portion 33*b* (specifically, the central axis BX of the shaft portion 33*b*) as shown in FIG. 15 (also refer to FIG. 18). At this time, in the transmission force acting on a contact point between the lock pin 26 and the lock lever 34, a component which is vertical to a straight line connecting the contact point to the center axis BX of the shaft portion 33*b* (also referred to as "vertical component") is contributed to the pivoting movement. Particularly, also because the shaft portion 33*b* exists at a position lower than the lock shaft 35, the component of the direction toward the lock shaft 35 in the transmission force chiefly functions as the vertical component, as a result, the pivoting movement about the shaft portion 33*b* is generated. Accordingly, the lock pin 26 can further move downward along an outside curved surface (upper-side curved surface) of the hook portion 34*f* of the pivoting lock lever 34. In brief, the lock lever 34 escapes to the back surface side (+Y side) of the camera, thereby enabling further downward movement of the lock pin 26 (without driving the moving core 43 electrically).

Figure 18:
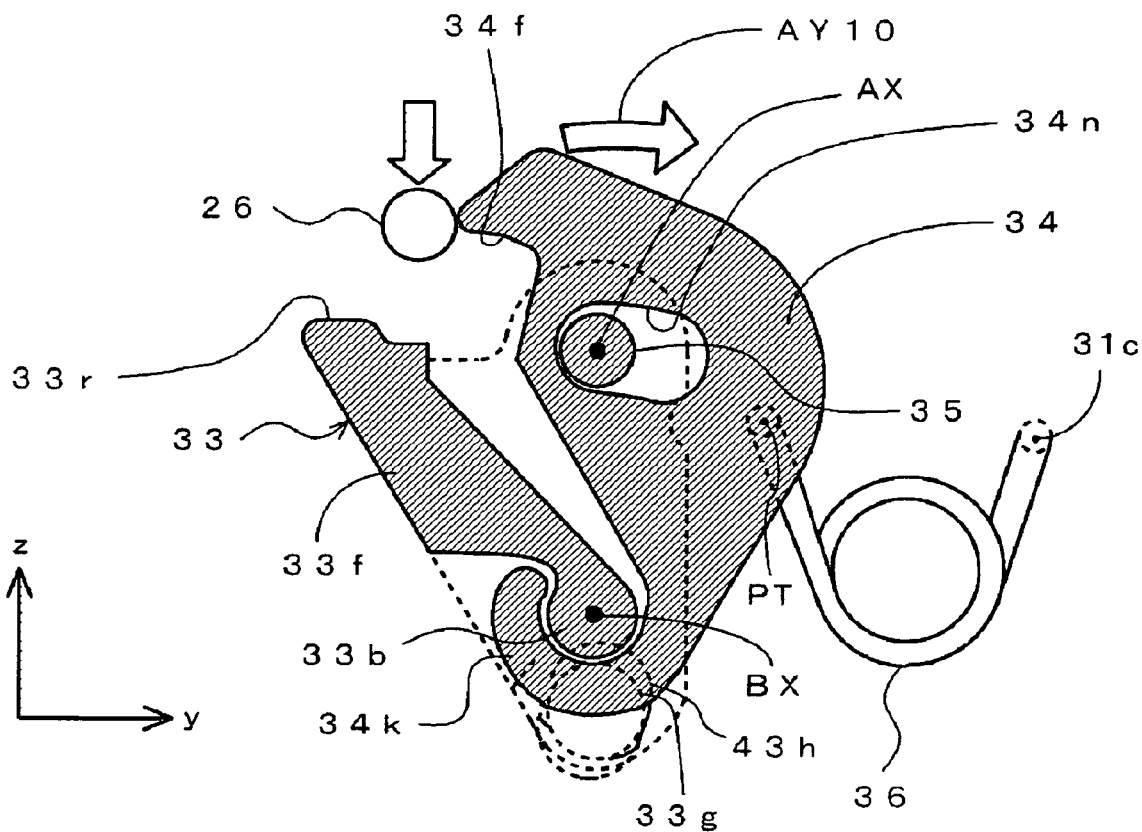
FIG. 18 is a partial sectional view corresponding to FIG. 15.
Figure 19:
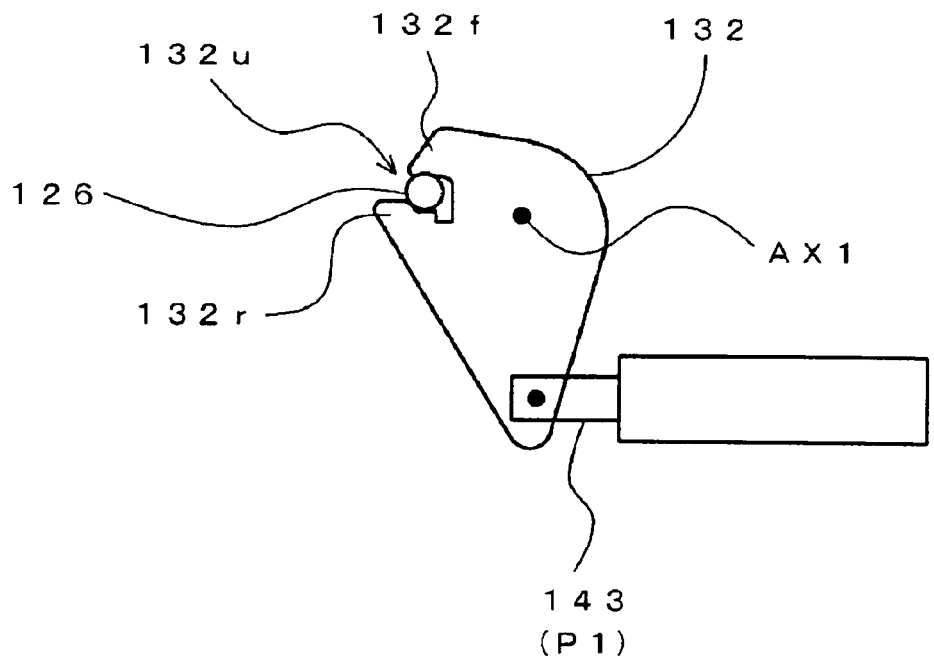
FIG. 19 is a view showing a reference example.
Figure 20:
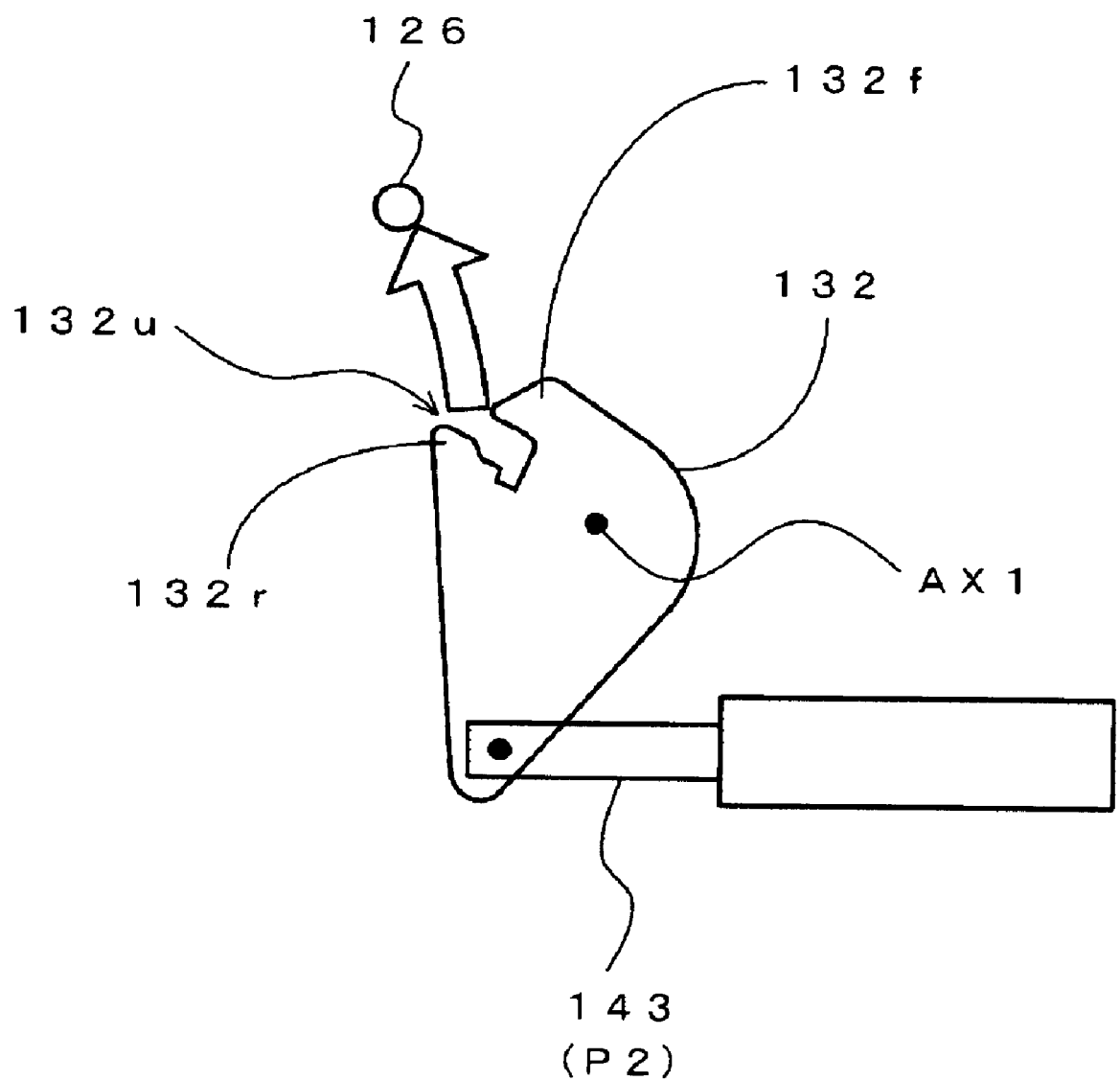
FIG. 20 is a view showing a reference example.
Figure 21:
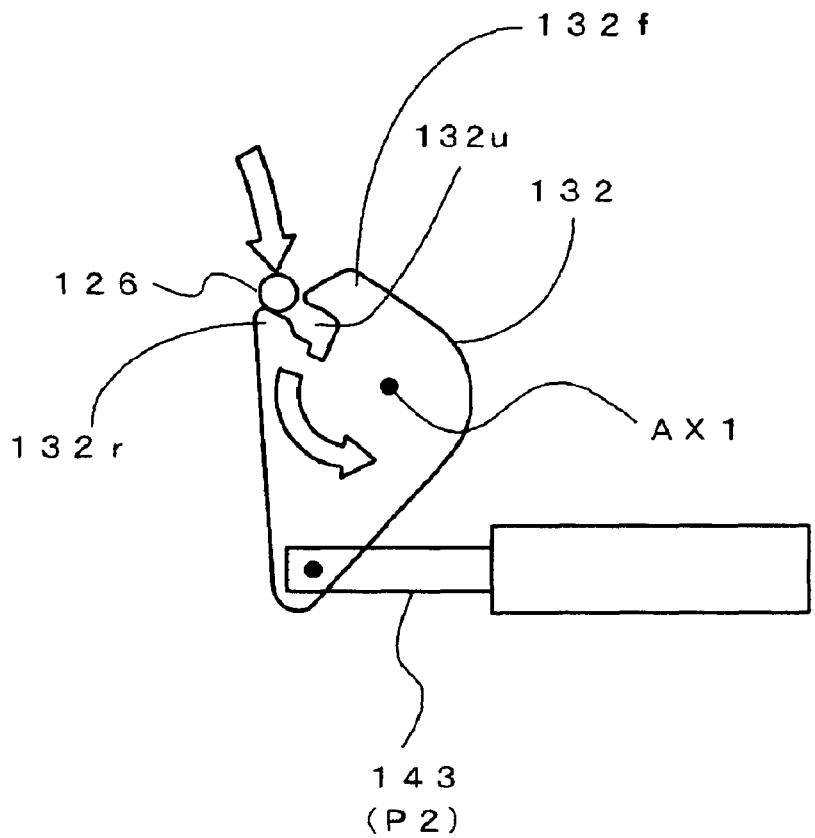
FIG. 21 is a view showing a reference example.
Figure 22:
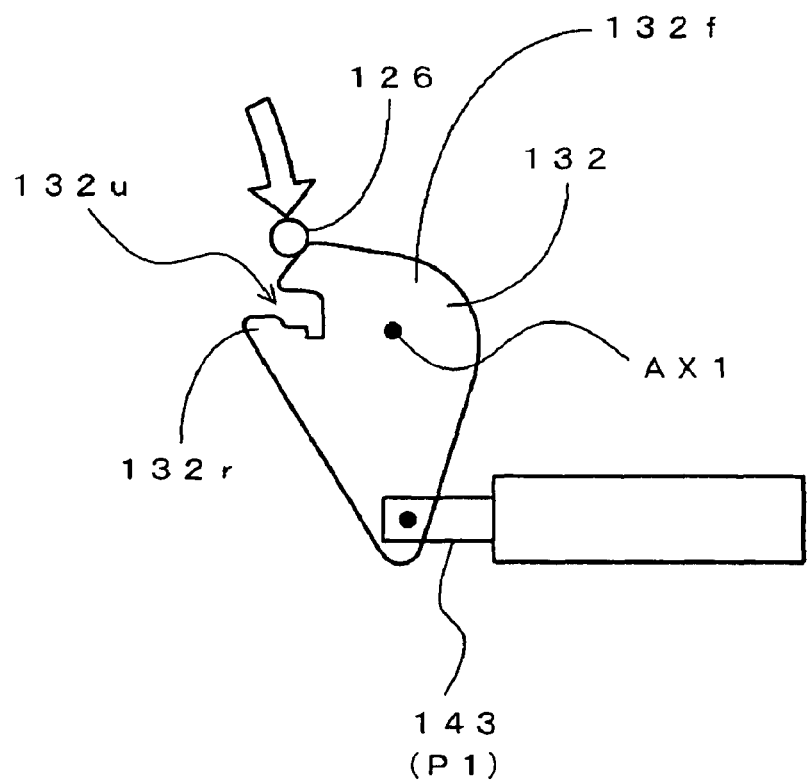
FIG. 22 is a view showing a reference example.

At this time, as shown in FIG. 17 and FIG. 18, the lock lever 34 and the lock shaft 35 relatively move with the pivoting operation of the lock lever 34. Specifically, the lock shaft 35 which is the shaft member relatively moves from one end side (back end side) (+Y side) of the guide hole 34*n* to the other end side (front end side) (−Y side) along the guide hole 34*n*. Specifically, the lock lever 34 pivots clockwise about the center axis BX of the shaft portion 33*b* and moves in the direction apart from the lock pin 26 by the force transmitted from the lock pin 26. In addition, the tip portion of the concave portion 32u opens further larger according to the clockwise pivoting movement of the lock lever 34.

After that, when the lock pin 26 moves downward to a given position (position in the vicinity of the concave portion 32u) while touching the lock lever 34, the contact direction between the lock pin 26 and the lock lever 34 is changed, and torque about the pivoting axis BX of the shaft portion 33b is changed. Specifically, torque by the elastic force due to the spring 36 becomes relatively larger than torque by the transmission force from the lock pin 26 in this case. Accordingly, as shown in FIG. 16, a biasing force by the spring 36 fixed at the position PT in the lock lever 34, namely, a force returning the lock lever 34 to the forward side (−Y side) largely acts. According to the biasing force of the spring 36, the lock lever 34 pivots in the reverse direction (counterclockwise) (direction of an arrow AY20 in FIG. 16) about the center axis BX of the shaft portion 33b and returns to the original position. In more detail, the lock pin 26 relatively enters the concave portion 32u while moving downward, which is formed in a manner being sandwiched by the lock lever arm 33 and the lock lever 34 of the lock mechanism 32.

At this time, the lock lever 34 and the lock shaft 35 perform relative movement which is reverse to the movement just before in this case. In detail, the lock shaft 35 relatively moves along the guide hole 34n from the other end side (forward end side) (−Y side) of the guide hole 34n to the one end side (back end side) (+Y side) of the guide hole 34n (refer to FIG. 17).

Accordingly, in the case that the flash light emitting portion 21 is housed from the abnormal return state of the moving core 43 (refer to FIG. 13), the lock pin 26 moves downward while touching the lock lever 34 (refer to FIG. 14), the lock lever 34 swings with respect to the lock lever arm 33 about the shaft portion 33b (refer to FIG. 15 and FIG. 16).

The lock pin 26 is locked by the lock mechanism 32 again. Specifically, the lock pin 26 is locked by the lock lever arm 33 and the lock lever 34 (chiefly by the hook portion 34f of the lock lover 34).

As described above, according to an imaging apparatus 1 of the embodiment, it is possible to allow the flash light emitting portion 21 to appropriately return to the housed state with the pressing operation of the flash light emitting portion 21 by the operator to lock the flash light emitting portion 21 appropriately. Particularly, even when the moving core 43 returns from the forward position P2 to the backward position P1 by the shock and the like though the flash light emitting portion 21 still exists at the light emitting position PG 20 as shown in FIG. 13, it is possible to securely lock the flash light emitting portion at the time of housing the flash light emitting portion. In this case, the lock pin 26 moves downward while touching the lock lever 34, and the lock lever 34 swings about the shaft portion 33b (which is different from the lock shaft 35) due to the force transmitted from the lock pin 26 to the lock lever 34 to lock the lock pin 26 again by the lock mechanism 32. That is, the lock operation of the lock pin 26 can be realized only by escaping the lock lever 34 slightly. Accordingly, it is possible to form the imaging apparatus 1 (particularly, the flash mechanism 20) in a compact manner.

<4. Others>

The embodiment of the invention has been explained as the above, the invention is not limited to the contents described above.

For example, in the embodiment, the case in which the biasing force is applied to the lock lever 34 by the spring 36 is cited as an example, however, it is not limited to this, and the same biasing force may be applied by other elastic means and the like.

In the embodiment, the biasing force is applied to the lock lever 34 by the spring 36 as well as the biasing force is also transmitted to the lock lever arm 33 through the lock lever 34. In other words, the spring 36 gives the biasing force for pivoting the lock mechanism 32 (lock lever arm 33 and the lock lever 34) about the lock shaft 35 as well as also gives the biasing force for pivoting the lock lever 34 about the shaft portion 33b. According to this, it is possible to give different kinds of biasing forces to the two members by the single spring 36. Therefore, it is efficient. However, it is not limited to this, and for example, it is also preferable that these two kinds of biasing forces are applied by different springs.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging apparatus comprising:
    a flash light emitting portion moving between a housed position and a light emitting position;
    a biasing means for biasing the flash light emitting portion toward the light emitting position;
    a member to be locked moving with a movement of the flash light emitting portion;
    a locking means which includes a first member and a second member, for locking the member to be locked in a state in which the flash light emitting portion exists at the housed position and suppressing change of the position of the flash light emitting portion, opposing a biasing force by the biasing means; and
    a lock releasing means which has an electromagnet and a moving portion moving with respect to the electromagnet, for releasing a locked state of the member to be locked by the locking means by moving the moving portion from a first position to a second position in a direction apart from the electromagnet by applying electric current to the electromagnet and by allowing the locking means to pivot about a first axis,
    wherein, when the locked state of the member to be locked is released by the lock releasing means, the flash light emitting portion moves to the light emitting position due to the biasing force by the biasing means,
    wherein, when a housing operation of the flash light emitting portion is performed in a first state in which the locked state is released and in which the moving portion exists at the second position, the member to be locked moves downward while touching the first member with the housing operation, the locking means pivots about the first axis due to a force transmitted from the member to be locked to the first member as well as the moving portion returns from the second position to the first position and the locking means locks the member to be locked again, and
    wherein, when the housing operation of the flash light emitting portion is performed in a second state in which the locked state is released and in which the flash light emitting portion still exists at the light emitting position though the locking means has pivoted about the first axis and the moving portion has returned from the second position to the first position, the member to be locked moves downward while touching the second member with the housing operation, the second member swings about a second axis which is different from the first axis due to a force transmitted from the member to be locked to the second member and the locking means locks the member to be locked again.

2. The imaging apparatus according to claim 1,
wherein the lock releasing means further includes an applying means for applying a second biasing force acting in the direction moving the moving portion from the first position to the second position, and
wherein, when the member to be locked moves downward while touching the second member with the housing operation of the flash light emitting portion, the second member moves in a first direction about the second axis, then, moves in a second direction which is reverse to the first direction by the second biasing force by the applying means and the member to be locked is locked again.

3. The imaging apparatus according to claim 2,
wherein the lock releasing means further includes a permanent magnet, and
wherein the moving portion is fixed at the first position, opposing the second biasing force due to a magnetic force of the permanent magnet in a state in which electric current is not applied to the electromagnet,
wherein the moving portion can move to the second position by generating a magnetic field which is reverse to the magnetic field of the permanent magnet by the electromagnet to reduce the force opposing the second biasing force in a state in which electric current is applied to the electromagnet.

4. The imaging apparatus according to claim 1,
wherein the second member has a guide hole which is a long hole through which a shaft member including the first axis pierces and is provided along an arc portion about the second axis,
wherein, when the locked state of the member to be locked is released by the lock releasing means, the first member and the second member pivot about the first axis in a state in which the shaft member exists at one end side of the guide hole and the moving portion moves from the first position to the second position, and
wherein, when the housing operation of the flash light emitting portion is performed in the second state, the second member relatively moves the shaft member from one end side of the guide hole to the other end side of the guide hole along the guide hole, then, returns the shaft member from the other end side to one end side to lock the member to be locked again at the time of swing movement of the second member about the second axis.

5. An imaging apparatus comprising:
a flash light emitting portion moving between a housed position and a light emitting position;
a biasing means for biasing the flash light emitting portion toward the light emitting position;
a member to be locked moving with a movement of the flash light emitting portion;
a locking means which includes a first member and a second member, for locking the member to be locked in a state in which the flash light emitting portion exists at the housed position and suppressing change of the position of the flash light emitting portion, opposing a biasing force by the biasing means; and
a lock releasing means which has an electromagnet and a moving portion moving with respect to the electromagnet, for releasing a locked state of the member to be locked by the locking means by moving the moving portion from a first position to a second position in a direction apart from the electromagnet and by allowing the locking means to pivot about a first axis,
wherein, when the locked state of the member to be locked is released by the lock releasing means, the flash light emitting portion moves to the light emitting position due to the biasing force by the biasing means, and
wherein, when a housing operation of the flash light emitting portion is performed in a state in which the locked state is released and in which the flash light emitting portion still exists at the light emitting position though the locking means has pivoted about the first axis and the moving portion has returned from the second position to the first position, the member to be locked moves downward while touching the second member with the housing operation, the second member swings about a second axis which is different from the first axis with respect to the first member due to a force transmitted from the member to be locked to the second member and the locking means locks the member to be locked again.

6. An imaging apparatus comprising:
a flash light emitting portion moving upward and downward between a housed position and a light emitting position;
a first biasing member biasing the flash light emitting portion toward the light emitting position;
a lock pin moving with a upward-and-downward movement of the flash light emitting portion;
a lock mechanism which includes a first member and a second member, locking the lock pin in a state in which the flash light emitting portion exists at the housed position and suppressing change of the position of the flash light emitting portion;
a second biasing member biasing the lock mechanism so as to pivot about a first axis in a given direction;
a drive portion having a moving portion connected to the lock mechanism and moving with respect to an electromagnet, moving the moving portion from a first position to a second position in a direction apart from the electromagnet by applying electric current to the electromagnet and allowing the lock mechanism to pivot about a first axis, and
wherein, when the moving portion moves from the first position to the second position, the first member and the second member pivot about the first axis due to a biasing force by the second biasing member to release the lock of the lock pin, and the flash light emitting portion moves upward to the light emitting position due to a biasing force by the first biasing member,
wherein, when a housing operation of the flash light emitting portion is performed in a first state in which the lock of the lock pin is released and in which the moving portion exists at the second position, the lock pin moves downward while touching the first member with the housing operation, the first member and the second member pivot about the first axis due to a force transmitted from the lock pin to the first member as well as the moving portion moves from the second position to the first position and the locking mechanism locks the lock pin again, and
wherein, when the housing operation of the flash light emitting portion is performed in a second state in which the lock of the lock pin is released and in which the flash light emitting portion still exists at the light emitting position though the first member and the second member have pivoted about the first axis and the moving portion has returned from the second position to the first position, the lock pin moves downward while touching the second member with the housing operation, the second member pivots about a second axis due to a force transmitted from the lock pin and moves in a direction apart from the lock pin, after that, the second member pivots and moves in a reverse direction by the biasing force of the second biasing member, and the lock mechanism locks the lock pin again.

7. An imaging apparatus comprising:

a flash light emitting portion moving between a housed position and a light emitting position;

a biasing portion configured to bias the flash light emitting portion toward the light emitting position;

a member to be locked moving with a movement of the flash light emitting portion;

a locking mechanism which includes a first member and a second member, locking the member to be locked in a state in which the flash light emitting portion exists at the housed position and suppressing change of the position of the flash light emitting portion, opposing a biasing force by the biasing portion; and a lock releasing portion which has an electromagnet and a moving portion moving with respect to the electromagnet, releasing a locked state of the member to be locked by the locking mechanism by moving the moving portion from a first position to a second position in a direction apart from the electromagnet by applying electric current to the electromagnet and by allowing the locking mechanism to pivot about a first axis, wherein, when the locked state of the member to be locked is released by the lock releasing portion, the flash light emitting portion moves to the light emitting position due to the biasing force by the biasing portion, wherein, when a housing operation of the flash light emitting portion is performed in a first state in which the locked state is released and in which the moving portion exists at the second position, the member to be locked moves downward while touching the first member with the housing operation, the locking mechanism pivots about the first axis due to a force transmitted from the member to be locked to the first member as well as the moving portion returns from the second position to the first position and the locking mechanism locks the member to be locked again, and wherein, when the housing operation of the flash light emitting portion is performed in a second state in which the locked state is released and in which the flash light emitting portion still exists at the light emitting position though the locking mechanism has pivoted about the first axis and the moving portion has returned from the second position to the first position, the member to be locked moves downward while touching the second member with the housing operation, the second member swings about a second axis which is different from the first axis due to a force transmitted from the member to be locked to the second member and the locking mechanism locks the member to be locked again.

8. An imaging apparatus comprising:

a flash light emitting portion moving between a housed position and a light emitting position;

a biasing portion configured to bias the flash light emitting portion toward the light emitting position;

a member to be locked moving with a movement of the flash light emitting portion;

a locking mechanism which includes a first member and a second member, locking the member to be locked in a state in which the flash light emitting portion exists at the housed position and suppressing change of the position of the flash light emitting portion, opposing a biasing force by the biasing portion; and a lock releasing portion which has an electromagnet and a moving portion moving with respect to the electromagnet, releasing a locked state of the member to be locked by the locking mechanism by moving the moving portion from a first position to a second position in a direction apart from the electromagnet and by allowing the locking mechanism to pivot about a first axis, wherein, when the locked state of the member to be locked is released by the lock releasing portion, the flash light emitting portion moves to the light emitting position due to the biasing force by the biasing portion, and wherein, when a housing operation of the flash light emitting portion is performed in a state in which the locked state is released and in which the flash light emitting portion still exists at the light emitting position though the locking mechanism has pivoted about the first axis and the moving portion has returned from the second position to the first position, the member to be locked moves downward while touching the second member with the housing operation, the second member swings about a second axis which is different from the first axis with respect to the first member due to a force transmitted from the member to be locked to the second member and the locking portion locks the member to be locked again.

* * * * *